United States Patent
Inoue et al.

(10) Patent No.: US 10,801,420 B2
(45) Date of Patent: Oct. 13, 2020

(54) CONTROL SYSTEM FOR COMPRESSION-IGNITION ENGINE

(71) Applicant: Mazda Motor Corporation, Aki-gun, Hiroshima (JP)

(72) Inventors: Atsushi Inoue, Aki-gun (JP); Masanari Sueoka, Hiroshima (JP); Kota Matsumoto, Aki-gun (JP); Keiji Maruyama, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 86 days.

(21) Appl. No.: 16/058,243

(22) Filed: Aug. 8, 2018

(65) Prior Publication Data

US 2019/0063337 A1 Feb. 28, 2019

(30) Foreign Application Priority Data

Aug. 24, 2017 (JP) .................. 2017-161577

(51) Int. Cl.
*F02D 17/02* (2006.01)
*F02B 1/12* (2006.01)
(Continued)

(52) U.S. Cl.
CPC ............. *F02D 17/02* (2013.01); *F02B 1/12* (2013.01); *F02B 7/00* (2013.01); *F02B 23/101* (2013.01);
(Continued)

(58) Field of Classification Search
CPC ...... F02D 17/02; F02D 37/02; F02D 41/0087; F02D 41/3029; F02D 41/3035;
(Continued)

(56) References Cited

U.S. PATENT DOCUMENTS 6,662,785 B1 * 12/2003 Sloane .................... F02D 13/06
123/198 F
2001/0013330 A1 * 8/2001 Grizzle ................... F02D 17/02
123/295

(Continued)

FOREIGN PATENT DOCUMENTS

JP    S5820925 A    2/1983
JP    S6095154 A    5/1985
(Continued)

*Primary Examiner* — John M Zaleskas
(74) *Attorney, Agent, or Firm* — Alleman Hall Creasman & Tuttle LLP

(57) ABSTRACT

A control device for a compression-ignition engine is provided, which includes an engine having a plurality of cylinders, spark plug, a fuel injector, and a control unit connected to the spark plug and the fuel injector. The control unit causes the engine to perform an all-cylinder operation when the engine operates at a load above a given load, and perform a reduced-cylinder operation at a load below the given load. In the reduced-cylinder operation, the fuel injector injects fuel to one or some of the cylinders to generate mixture gas, the spark plug ignites the mixture gas, and the engine starts, at an air-fuel ratio larger than a stoichiometric air-fuel ratio and a large compression ratio, SI combustion in which the mixture gas is ignited to combust by flame propagation, and then perform CI combustion in which unburned mixture gas ignites by self-ignition.

9 Claims, 17 Drawing Sheets

(51) Int. Cl.
*F02B 23/10* (2006.01)
*F02D 41/38* (2006.01)
*F02P 5/04* (2006.01)
*F02P 5/15* (2006.01)
*F02D 41/00* (2006.01)
*F02B 7/00* (2006.01)
*F02D 41/30* (2006.01)
*F02D 41/40* (2006.01)

(52) U.S. Cl.
CPC ..... *F02D 41/0087* (2013.01); *F02D 41/3041* (2013.01); *F02D 41/38* (2013.01); *F02D 41/402* (2013.01); *F02P 5/045* (2013.01); *F02P 5/1502* (2013.01); *F02B 2023/108* (2013.01); *F02D 41/3047* (2013.01); *F02D 2041/0015* (2013.01); *F02D 2041/389* (2013.01); *F02D 2200/021* (2013.01); *F02D 2200/0414* (2013.01); *F02D 2200/1002* (2013.01)

(58) Field of Classification Search
CPC ............. F02D 41/3041; F02D 41/3047; F02D 2041/0015; F02B 1/12
See application file for complete search history.

(56) References Cited

U.S. PATENT DOCUMENTS

| | | | | |
|---|---|---|---|---|
| 2003/0101961 | A1* | 6/2003 | Foster | B60H 1/00314 123/198 F |
| 2004/0065279 | A1* | 4/2004 | Hitomi | F01L 1/267 123/58.8 |
| 2005/0022755 | A1* | 2/2005 | Hitomi | F01L 1/185 123/58.8 |
| 2007/0181354 | A1* | 8/2007 | Andri | B60K 6/48 180/65.29 |
| 2007/0204830 | A1* | 9/2007 | Andri | B60K 6/445 123/198 F |
| 2007/0204838 | A1* | 9/2007 | Leone | B60K 6/365 123/518 |
| 2007/0205028 | A1* | 9/2007 | Leone | B60K 6/445 180/65.28 |
| 2007/0205029 | A1* | 9/2007 | Leone | B60K 6/365 180/65.225 |
| 2008/0135021 | A1* | 6/2008 | Michelini | F02D 13/0253 123/481 |
| 2008/0300773 | A1* | 12/2008 | Winstead | F02D 13/0253 701/105 |
| 2009/0013667 | A1* | 1/2009 | Winstead | F02D 13/0207 60/278 |
| 2009/0013668 | A1* | 1/2009 | Winstead | F02D 13/0207 60/278 |
| 2009/0013669 | A1* | 1/2009 | Winstead | F02D 13/0207 60/278 |
| 2009/0013969 | A1* | 1/2009 | Winstead | F02D 13/0207 123/481 |
| 2010/0299049 | A1* | 11/2010 | Kang | F02D 41/0087 701/103 |
| 2011/0178693 | A1* | 7/2011 | Chang | F02D 41/0087 701/103 |
| 2011/0238280 | A1* | 9/2011 | Shibata | F02D 11/105 701/102 |
| 2013/0276749 | A1* | 10/2013 | Springer | F02D 17/02 123/349 |
| 2013/0276755 | A1* | 10/2013 | Springer | F02D 17/02 123/435 |
| 2014/0060490 | A1* | 3/2014 | Iwai | F02D 41/30 123/478 |

FOREIGN PATENT DOCUMENTS

| | | | |
|---|---|---|---|
| JP | H9112257 A | | 4/1997 |
| JP | 2003049691 A | | 2/2003 |
| JP | 2006283601 A | | 10/2006 |
| JP | 2006283667 A | * | 10/2006 |
| JP | 2006283667 A | | 10/2006 |
| JP | 2007154859 A | | 6/2007 |
| JP | 2009287541 A | | 12/2009 |
| JP | 2010077857 A | * | 4/2010 |
| JP | 2010077857 A | | 4/2010 |
| JP | 2010196650 A | | 9/2010 |
| JP | 2011021553 A | | 2/2011 |
| JP | 2017110617 A | | 6/2017 |
| JP | 2017115587 A | | 6/2017 |

* cited by examiner

CONTROL SYSTEM FOR COMPRESSION-IGNITION ENGINE

TECHNICAL FIELD

The present disclosure relates to a control system for a compression-ignition engine.

BACKGROUND OF THE DISCLOSURE

JP2007-154859A discloses a control device for a spark-ignition gasoline engine including an HCCI (Homogeneous-Charge Compression Ignition) executing part which executes a compression self-ignition operation at least within a partial-load operating range of the engine, and an ignition assisting part which assists the ignition in the compression self-ignition operation within the partial-load operating range. At a low engine load side of the partial-load operating range, the control device executes a reduced-cylinder operation. JP2007-154859A also discloses performing combustion at an excess air ratio λ=1 during the reduced-cylinder operation.

However, due to performing the combustion at the excess air ratio λ=1 during the reduced-cylinder operation, the conventional control device for the spark-ignition gasoline engine provided with the ignition assisting part and the HCCI executing part causes an issue of poor fuel efficiency.

Although it may be considered to bring an air-fuel ratio A/F to be lean within a low engine load operating range, this makes flame propagation in SI (Spark Ignition) combustion difficult, and also fluctuates a combustion timing of CI (Compression Ignition) combustion.

SUMMARY OF THE DISCLOSURE

The present disclosure is made in view of solving the issues of the conventional art described above, and aims to improve fuel efficiency, perform a stable SI combustion operation, and also perform a subsequent CI combustion operation at a desirable timing even during a reduced-cylinder operation within a low engine load operating range.

The SI combustion is combustion accompanying flame propagation which starts by forcibly igniting a mixture gas inside a combustion chamber, and the CI combustion is combustion which starts by the mixture gas inside the combustion chamber self-igniting by being compressed. In a combustion mode combining the SI combustion and the CI combustion, the mixture gas inside the combustion chamber is forcibly ignited to start its combustion through the flame propagation, and then heat generated by the SI combustion and pressure raised by the flame propagation causes combustion of an unburned mixture gas inside the combustion chamber by the compression ignition. Hereinafter, this combustion mode is referred to as SPCCI (SPark Controlled Compression Ignition) combustion.

In the combustion by the compression ignition, the timing of the compression ignition changes greatly if the temperature inside the combustion chamber varies before the compression starts. In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the timing of the compression ignition can be controlled.

The SI combustion by flame propagation causes a relatively gentle pressure rise compared to the CI combustion, thus the SPCCI combustion reduces combustion noise. Further, the CI combustion shortens the combustion period compared to the SI combustion, thus the SPCCI combustion is advantageous in improving fuel efficiency.

When the engine is operating within a low load range, a fuel injection amount decreases and the temperature inside the combustion chamber also decreases. Therefore, even if the SPCCI combustion is to be performed, spark ignition is difficult to be performed and the SI combustion becomes unstable, and also the CI combustion may not be able to be performed due to the insufficient temperature.

Thus, the present inventors aim to achieve, even within such a low load range which is disadvantageous for the SPCCI combustion, the stable SPCCI combustion while making an air-fuel ratio (A/F) lean.

The art disclosed here is a configuration in which within the low load range, a so called reduced-cylinder operation in which fuel is supplied only to one or some of a plurality of cylinders while not supplied to the other cylinders under a certain condition, is performed at a large compression ratio above a given value.

Specifically, according to one aspect of the present disclosure, a control system for the compression-ignition engine includes an engine having a plurality of cylinders formed with a combustion chamber, respectively, a spark plug disposed in each of the combustion chambers, a fuel injector disposed to be oriented into each combustion chamber, and a control unit connected to the spark plug and the fuel injector and configured to output a control signal to the spark plug and the fuel injector, respectively. When the engine operates at a load above a given load, the control unit causes the engine to perform an all-cylinder operation by supplying fuel to all the plurality of cylinders, and when the engine operates at a load below the given load, the control unit causes the engine to perform a reduced-cylinder operation by supplying the fuel to one or some of the plurality of cylinders. In the reduced-cylinder operation, the control unit controls the fuel injector to inject the fuel to the one or some of the plurality of cylinders to generate a mixture gas, controls the spark plug to ignite the mixture gas, and causes the engine to start, at an air-fuel ratio larger than a stoichiometric air-fuel ratio and a large compression ratio above a given value, spark ignition (SI) combustion in which the mixture gas is ignited by the spark plug to combust by flame propagation, and then perform compression ignition (CI) combustion in which unburned mixture gas ignites by compression ignition.

Here, the "engine" may be a four-stroke engine which is operated by the combustion chamber repeating intake stroke, compression stroke, expansion stroke, and exhaust stroke.

According to this configuration, within a low load range (below the given load), the reduced-cylinder operation in which the fuel is supplied to one or some of the plurality of cylinders is performed, and at the air-fuel ratio larger than the stoichiometric air-fuel ratio (i.e., a lean A/F) and the large compression ratio above the given value (e.g., a geometric compression ratio is approximately 13:1 or above), the SI combustion and the subsequent CI combustion are performed. By performing the reduced-cylinder operation while the A/F is lean, discharge of unprocessed $NO_x$ (raw $NO_x$) is reduced and fuel efficiency is improved. Further, during the reduced-cylinder operation, since the CI combustion is performed at the large compression ratio above the given value, a combustion timing of the CI combustion less likely fluctuates. Therefore, the CI combustion is performed stably, in other words, at a desirable timing.

In the reduced-cylinder operation, the control unit may operate an intake valve and an exhaust valve of each of a remainder of the plurality of cylinders.

Thus, it is unnecessary to provide a valve stop mechanism which is high in cost. Specifically, since the A/F of the mixture gas is lean, the valves of the deactivated cylinder are not required to be stopped to apply the stoichiometric air-fuel ratio, thus a pumping loss is reduced.

When a temperature of intake air into the combustion chamber is below a given value, the control unit may perform the all-cylinder operation instead of the reduced-cylinder operation.

Thus, instability of the SI combustion at the low intake air temperature is eliminated, and therefore, the combustion timing in the subsequent CI combustion is prevented from being delayed.

When a temperature of cooling water of the engine is below a given value, the control unit may perform the all-cylinder operation instead of the reduced-cylinder operation.

Thus, in the all-cylinder operation, compared to the reduced-cylinder operation, cooling of unburned mixture gas (end gas) near a wall surface of the combustion chamber or in vicinity thereof is promptly canceled, which prevents the delay of the combustion start timing of the CI combustion.

The control system may further include a swirl control valve configured to generate a swirl flow in each combustion chamber. The control unit may control the swirl control valve to generate the swirl flow in the combustion chamber in the reduced-cylinder operation.

By generating the swirl flow, the SI combustion is stabilized and the CI combustion is suitably adjusted. Further, a variation of torque between combustion cycles is reduced.

In this case, a swirl ratio of the swirl flow may be 2 or above.

Thus, as described later, the swirl flow generated in the combustion chamber is strengthened and the SI combustion is performed stably.

When the engine operates at a load below the given load, the control unit may switch an operating mode of the engine between a first combustion mode in which the SI combustion and the CI combustion are performed in this order at an air-fuel ratio equivalent to a stoichiometric air-fuel ratio, and a second combustion mode in which the SI combustion and the CI combustion are performed in this order at an air-fuel ratio larger than the stoichiometric air-fuel ratio. When the engine operates in the first combustion mode, the reduced-cylinder operation may not be performed.

Thus, in the first combustion mode in which the SI combustion and the subsequent CI combustion are performed at the air-fuel ratio equivalent to the stoichiometric air-fuel ratio, since the all-cylinder operation is performed instead of the reduced-cylinder operation, generation of $NO_x$ when shifting the control to the reduced-cylinder operation is prevented.

According to another aspect of the present disclosure, a control system for a compression-ignition engine is provided, which includes an engine having a plurality of cylinders formed with a combustion chamber, respectively, a spark plug disposed in each combustion chamber, a fuel injection valve disposed to be oriented into each combustion chamber, an air-fuel ratio control valve configured to control an air-fuel ratio of a mixture gas within the combustion chamber, and a control unit connected to the spark plug, the fuel injection valve, and the air-fuel ratio control valve and configured to output a control signal to the spark plug, the fuel injection valve, and the air-fuel ratio control valve, respectively. The control unit includes a processor configured to execute an engine load determining module to determine whether an engine load is above a given load, an all-cylinder operation controlling module to, when the engine load is determined to be above the given load, control the fuel injection valve to inject the fuel to all the plurality of cylinders, and a reduced-cylinder operation controlling module to, when the engine load is determined to be below the given load, control the fuel injection valve to stop the injection of the fuel to one or some of the plurality of cylinders. The reduced-cylinder operation controlling module has an air-fuel ratio controlling submodule configured to control the air-fuel ratio control valve to bring the air-fuel ratio larger than the stoichiometric air-fuel ratio, and a spark plug controlling submodule configured to output a control signal to the spark plug to perform the ignition at a given ignition timing so that the mixture gas starts combustion by flame propagation and then unburned mixture gas self-ignites, the given ignition timing being stored in memory.

DETAILED DESCRIPTION OF THE DISCLOSURE (Embodiment)

One embodiment of the present disclosure is described in detail with reference to the accompanying drawings.

Figure 1:
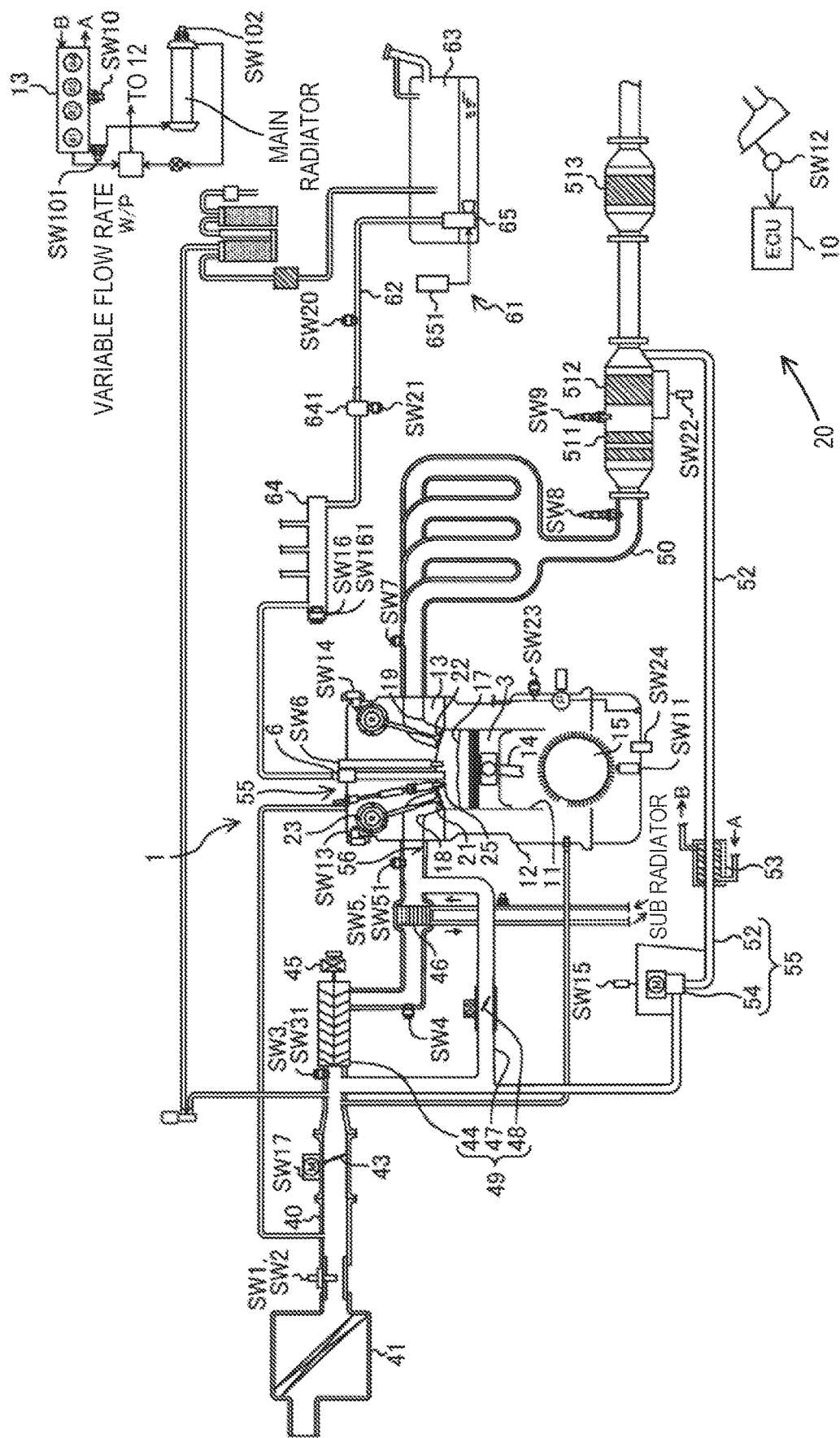
FIG. 1 is a system diagram of an engine and its auxiliaries according to one embodiment of the present disclosure.
Figure 2:
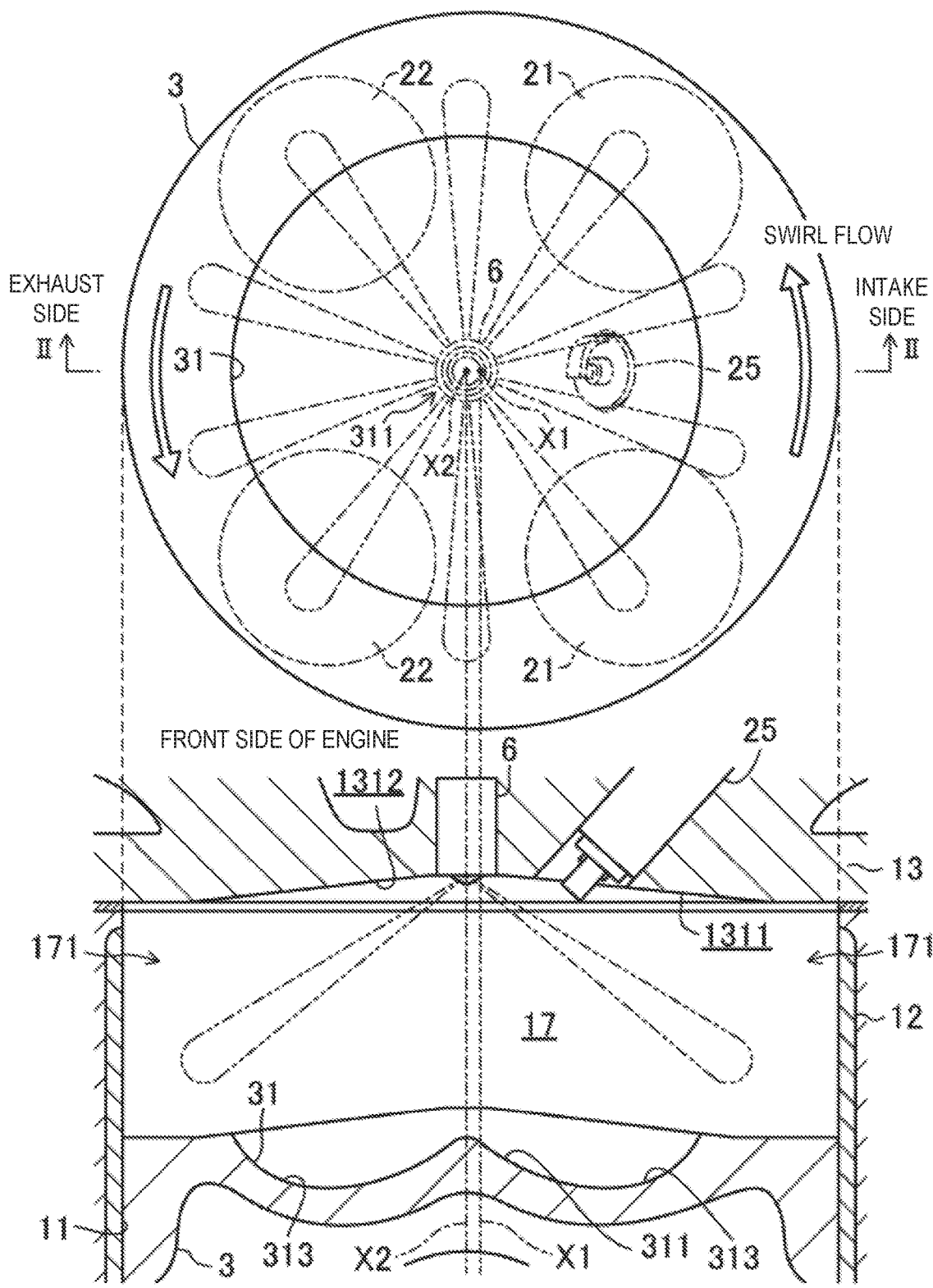
FIG. 2 shows a plan view (upper part) illustrating one example of a structure of a combustion chamber of the engine and a cross-sectional view (lower part) taken in a line II-II according to the embodiment of the present disclosure.
Figure 3:
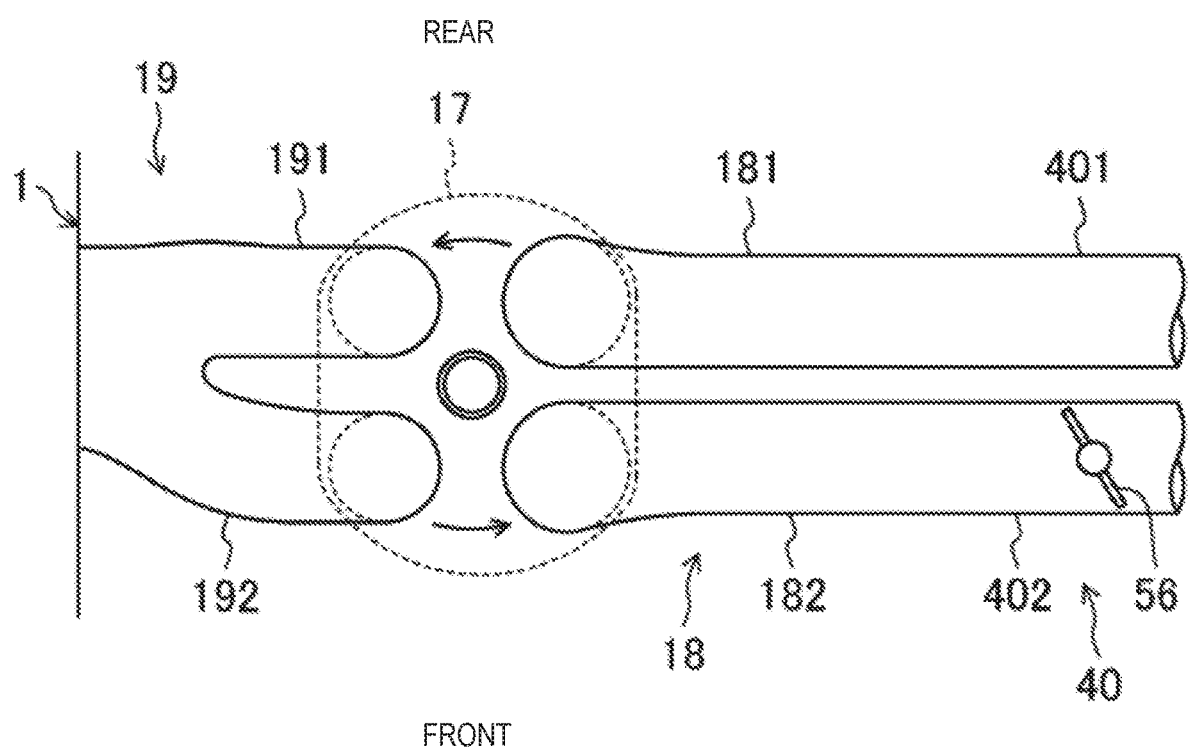
FIG. 3 is a plan view illustrating one example of structures of the combustion chamber and an intake system of the engine according to the embodiment of the present disclosure.
Figure 4:
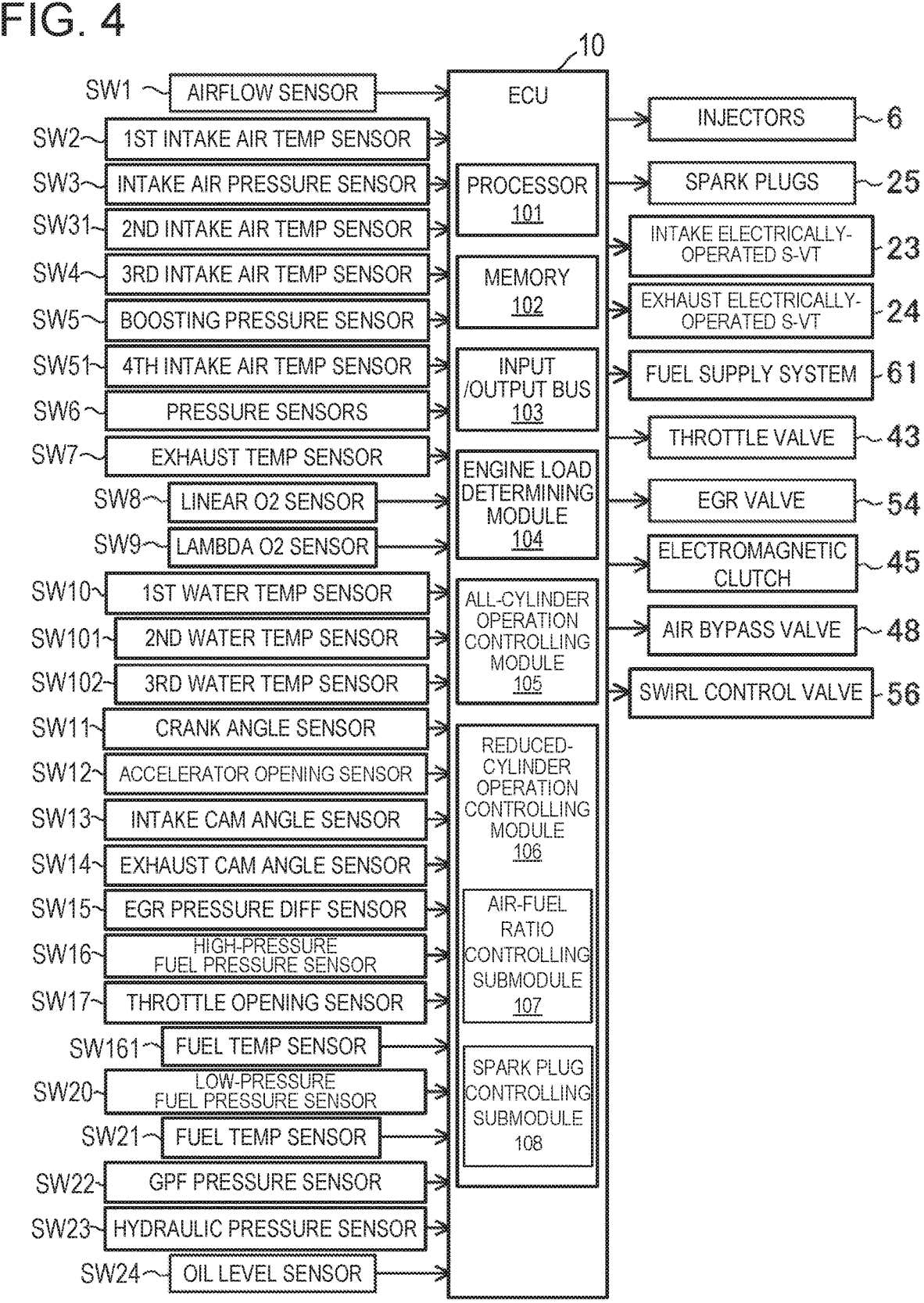
FIG. 4 is a block diagram illustrating one example of a configuration of a control device for the engine according to the embodiment of the present disclosure.

Hereinafter, one embodiment of a control system for a premixture compression-ignition engine is described in detail with reference to the accompanying drawings. The following description gives one example of the control system for the engine. FIG. 1 is a diagram illustrating a configuration of the engine. FIG. 2 is a view illustrating a structure of a combustion chamber, in which the upper part is a plan view of the combustion chamber and the lower part is a cross-sectional view taken in a line II-II. FIG. 3 is a plan view illustrating structures of the combustion chamber and an intake system. Note that in FIG. 1, an intake side is on the left side and an exhaust side is on the right side of the drawing sheet. Further in FIGS. 2 and 3, the intake side is on the right side and the exhaust side is on the left side of the drawing sheets. FIG. 4 is a block diagram illustrating a configuration of a control device for the engine.

An engine 1 is a four-stroke engine which is operated by a combustion chamber 17 repeating intake stroke, compression stroke, expansion stroke, and exhaust stroke. The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is a liquid fuel containing at least gasoline.

(Engine Configuration)

The engine 1 includes a cylinder block 12 and a cylinder head 13 placed and fixed on the cylinder block 12. The cylinder block 12 is formed therein with a plurality of cylinders 11. In FIGS. 1 and 3, only one cylinder 11 is illustrated. The engine 1 is a multi-cylinder engine.

A piston 3 is reciprocatably inserted in each cylinder 11. The piston 3 is coupled to a crankshaft 15 via a connecting rod 14. The piston 3 defines the combustion chamber 17 together with the cylinder 11 and the cylinder head 13. Note that the definition of "combustion chamber" is not limited to a space formed when the piston 3 is at a top dead center on compression stroke (CTDC) but may be broad. That is, "combustion chamber" may mean any space formed by the piston 3, the cylinder 11, and the cylinder head 13 regardless of the position of the piston 3.

An upper surface of the piston 3 is flat. The piston 3 is dented in its upper surface to form a cavity 31. The cavity 31 is arranged opposing to an injector 6 described later.

The cavity 31 has a convex section 311. The convex section 311 is slightly offset from a center axis X1 of the cylinder 11 to an exhaust side. The convex section 311 has a substantially conical shape. The convex section 311 extends upwardly in an axis X2 parallel to the center axis X1 of the cylinder 11, from the bottom of the cavity 31. An upper end of the convex section 311 is located at substantially the same height as that of an upper surface of a circumferential edge portion of the cavity 31.

A circumferential side face of the cavity 31 extends from a bottom surface of the cavity 31 to an opening surface of the cavity 31, inclined with respect to the axis X2. An inner diameter of the cavity 31 gradually increases from the bottom surface of the cavity 31 to the opening surface of the cavity 31.

The cavity 31 has a bottom section 313. An intake-side area of the bottom section 313 opposes to a spark plug 25 described later. As illustrated in the upper part of FIG. 2, the bottom section 313 has a given horizontal size.

Further, as illustrated in the lower part of FIG. 2, a lower surface of the cylinder head 13, that is, a ceiling surface of the combustion chamber 17, is formed by an intake-side inclined surface 1311 and an exhaust-side inclined surface 1312. The inclined surface 1311 inclines upwardly toward the axis X2 from the intake side. On the other hand, the inclined surface 1312 inclines upwardly toward the axis X2 from the exhaust side. The ceiling surface of the combustion chamber 17 has a so-called pent-roof shape.

Note that the shape of the combustion chamber 17 is not limited to that illustrated in FIG. 2. The shapes of the cavity 31, the upper surface of the piston 3, the ceiling surface of the combustion chamber 17, etc. are suitably changeable.

Further the cavity 31 may have a symmetric shape with respect to the center axis X1 of the cylinder 11. The inclined surfaces 1311 and 1312 may have a symmetric shape with respect to the center axis X1 of the cylinder 11.

The geometric compression ratio of the engine 1 is set to be between 13:1 and 20:1. As described later, within some of operating ranges of the engine 1, the engine 1 performs an SPCCI combustion operation in which SI combustion and CI combustion are combined. In the SPCCI combustion operation, a CI combustion operation is performed by utilizing heat generated by the SI combustion and pressure increase. In this engine 1, it is unnecessary to raise the temperature of the combustion chamber 17 when the piston 3 reaches CTDC for the mixture gas to self-ignite (i.e., the compression end temperature). That is, although the engine 1 performs the CI combustion operation, its geometric compression ratio is set relatively small. Lowering the geometric compression ratio is advantageous in reducing a cooling loss and a mechanical loss. For example, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has such a shape that a tumble flow is formed in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIGS. 1 and 4, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the operating mechanism of the intake valve 21 may have a hydraulically-operated S-VT instead of the electrically-operated S-VT.

The cylinder head 13 is formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17. An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIGS. 1 and 4, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the exhaust valve operating mechanism may have a hydraulically-operated S-VT instead of the electrically-operated S-VT.

The engine 1 adjusts the length of an overlap period of an open timing of the intake valve 21 and a close timing of the exhaust valve 22 by the intake electrically-operated S-VT 23 and the exhaust electrically-operated S-VT 24. Thus, hot burned gas is enclosed within the combustion chamber 17. That is, internal EGR (Exhaust Gas Recirculation) gas is introduced into the combustion chamber 17. Further, by adjusting the length of the overlap period, residual gas in the combustion chamber 17 is scavenged.

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect, so as to be oriented into the combustion chamber 17. As illustrated in FIG. 2, the injector 6 is disposed so that its injection axis is located parallel to the center axis X1 of the cylinder. The injection axis of the injector 6 is in agreement with the axis X2 and coincides with the position of the convex section 311 of the cavity 31. The injector 6 is oriented toward the cavity 31. Note that the injection axis of the injector 6 may coincide with the center axis X1 of the cylinder 11. Also in this case, it is desirable that the injection axis of the injector 6 coincide with the position of the convex section 311 of the cavity 31.

Although not illustrated in detail, the injector 6 is constructed by a multi-port fuel injection valve having a plurality of nozzle ports. As illustrated by a plurality of areas formed by two-dotted chain lines in FIG. 2, the injector 6 injects the fuel so that the fuel spray spreads obliquely downward from the radial center of a ceiling portion of the combustion chamber 17 while spreading radially. In this configuration example, the injector 6 has ten nozzle ports, and the nozzle ports are arranged at an even angular interval in the circumferential direction. Note that the number of nozzle ports may be eight. As illustrated in the upper part of FIG. 2, the axes of the nozzle ports do not circumferentially overlap with the spark plug 25 described later. That is, the spark plug 25 is sandwiched between the axes of two adjacent nozzle ports. Thus, the fuel spray injected from the injector 6 is prevented from directly hitting the spark plug 25 and getting an electrode wet.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this configuration example, the fuel pump 65 is a motor pump and disposed inside the fuel tank 63. Moreover, the fuel pump 65 is connected to a fuel pump controller 651. The common rail 64 stores the fuel pumped from the fuel pump 65 at high fuel pressure. The common rail 64 is provided with a high-pressure fuel pressure sensor SW16 and a fuel temperature sensor SW161. When the injector 6 opens, the fuel stored in the common rail 64 is injected into the combustion chamber 17 from each nozzle port of the injector 6. The fuel supply system 61 is able to supply the fuel at a high pressure of 30 MPa or higher to the injector 6. A highest fuel pressure of the fuel supply system 61 may be set, for example, to about 120 MPa. The pressure of the fuel supplied to the injector 6 may be changed according to an operating state of the engine 1. Note that the structure of the fuel supply system 61 is not limited to the above structure.

Further, a high-pressure fuel pressure pump 641 and a low-pressure fuel pressure sensor SW20 located upstream thereof are disposed in the fuel supply path 62 between the common rail 64 and the fuel pump 65. The high-pressure fuel pressure pump 641 is provided with a fuel temperature sensor SW21.

The spark plug 25 is attached to the cylinder head 13 for each cylinder 11. The spark plug 25 forcibly ignites the mixture gas in the combustion chamber 17. In this configuration example, as illustrated in FIG. 2, the spark plug 25 is disposed at an intake side of the cylinder 11 with respect to the center axis X1 of the cylinder 11. The spark plug 25 is located adjacent to the injector 6. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13. The electrode of the spark plug 25 is located near the ceiling surface of the combustion chamber 17 to be oriented toward inside the combustion chamber 17.

The cylinder head 13 is provided, on the other side (i.e., the exhaust side) of the spark plug 25 with respect to the center axis X1 of each cylinder 11, with a pressure sensor SW6 which detects pressure inside the combustion chamber 17.

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank (not illustrated) is disposed near a downstream end of the intake passage 40. A part of the intake passage 40 downstream of the surge tank forms independent passages branching for the respective cylinders 11. Downstream ends of the independent passages communicate with the intake ports 18 of the cylinders 11, respectively.

A throttle valve 43 (one example of the air-fuel ratio control valve) is disposed in the intake passage 40 between the air cleaner 41 and the surge tank. The throttle valve 43 adjusts an introduction amount of fresh air into the combustion chamber 17 by adjusting an opening thereof.

A booster 44 is disposed in the intake passage 40 downstream of the throttle valve 43. The booster 44 boosts the gas to be introduced into the combustion chamber 17. In this configuration example, the booster 44 is a supercharger which is driven by the engine 1. The booster 44 may be, for example, of a Roots type. The booster 44 may have any structure, for example, of a Lisholm type, a Vane type, or a centrifugal type.

An electromagnetic clutch 45 is interposed between the booster 44 and the engine 1. The electromagnetic clutch 45 controls the flow of a driving force between the booster 44 and the engine 1, for example, it transmits the driving force from the engine 1 to the booster 44 or interrupts the transmission of the driving force therebetween. As is described later, by an ECU (Engine Control Unit) 10 switching the connection/disconnection of the electromagnetic clutch 45, the on/off of the booster 44 is switched. In this engine 1, boosting the gas to be introduced into the combustion chamber 17 by the booster 44 and not boosting the same are switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), the gas passed through the booster 44 partially flows back upstream of the booster 44 through the bypass passage 47. By controlling an opening of the air bypass valve 48, a backflow amount is adjusted, which leads to adjusting a boosting pressure of the gas introduced into the combustion chamber 17. In this configuration example, a boosting system 49 is comprised of the booster 44, the bypass passage 47 and the air bypass valve 48.

The engine 1 has a swirl generating part which generates a swirl flow in the combustion chamber 17. In one example, as illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively. The SCV 56 is an opening regulating valve which is capable of adjusting an opening of a cross section of the secondary passage 402. When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow in the combustion chamber 17 becomes strong. When the opening of the SCV 56 is large, the flow rates of the intake air into the combustion chamber 17 from the first intake port 181 and the second intake port 182 become substantially even, and thus the swirl flow in the combustion chamber 17 becomes weak. When the SCV 56 is fully opened, a swirl flow does not occur. Note that the swirl flow circulates in the counterclockwise direction in FIG. 3 as indicated by the arrows (also see the white outlined arrows in FIG. 2).

Note that alternatively/additionally to attaching the SCV 56 to the intake passage 40, the swirl generating part may adopt a structure in which the open periods of the two intake valves 21 are varied so as to introduce the intake air into the combustion chamber 17 from only one of the intake valves 21. By opening only one of the two intake valves 21, the intake air is introduced unevenly into the combustion chamber 17, and thus, the swirl flow is generated in the combustion chamber 17. Alternatively, the shapes of the intake ports 18 may be devised so that the swirl generating part generates the swirl flow in the combustion chamber 17.

An exhaust passage 50 is connected to a side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although is not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having a plurality of catalytic converters are disposed in the exhaust passage 50. Although is not illustrated, the catalytic converter on the upstream side is disposed in an engine room and has a three-way catalyst 511 and a GPF (Gasoline Particulate Filter) 512. The catalytic converter on the downstream side is disposed outside the engine room and has a three-way catalyst 513. Note that the exhaust gas purification system is not limited to have the illustrated structure.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44.

A water-cooling type EGR cooler 53 is disposed in the EGR passage 52. The EGR cooler 53 cools the burned gas. An EGR valve 54 (another example of the air-fuel ratio control valve) is also disposed in the EGR passage 52. The EGR valve 54 adjusts the flow rate of the burned gas in the EGR passage 52. By adjusting an opening of the EGR valve 54, the recirculation amount of the cooled burned gas (i.e., external EGR gas) is adjusted.

In this configuration example, an EGR system 55 includes an external EGR system including the EGR passage 52 and the EGR valve 54, and an internal EGR system including the intake electrically-operated S-VT 23 and the exhaust electrically-operated S-VT 24 described above.

A control system 20 for the compression self-ignition engine includes the ECU 10 configured to operate the engine 1. As illustrated in FIG. 4, the ECU 10 is a control unit based on a well-known microcomputer and includes a processor (e.g., a central processing unit (CPU)) 101 configured to execute program(s)/instructions, memory 102 comprised of RAM(s) (Random Access Memory) and ROM(s) (Read Only Memory) and configured to store the program(s)/instructions and data, an input/output bus 103 configured to input and output electric signals, an engine load determining module 104, an all-cylinder operation controlling module 105, a reduced-cylinder operation controlling module 106. The reduced-cylinder operation controlling module 106 comprises an air-fuel ratio controlling submodule 107, and a spark plug controlling submodule 108. The processor 101 is configured to execute these modules and submodules to perform their respective functions. These modules and submodules are stored in the memory 102 as programs. The ECU 10 is one example of a "control unit."

As illustrated in FIGS. 1 and 4, various sensors, such as SW1 to SW17, SW20 to SW24, SW31, SW51, SW101, SW102, and SW161 are connected to the ECU 10. These sensors output detection signals to the ECU 10. The sensors include the following sensors, for example.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, an intake air pressure sensor SW3 disposed in the intake passage 40 downstream of the connecting position with the EGR passage 52 and upstream of the booster 44, and configured to detect pressure of the gas flowing into the booster 44, a second intake air temperature sensor SW31 disposed in the intake passage 40 downstream of the connecting position with the EGR passage 52 and upstream of the booster 44, and configured to detect a temperature of the gas, a third intake air temperature sensor SW4 disposed in the intake passage 40 downstream of the booster 44 and upstream of the intercooler 46 and configured to detect a temperature of the gas flowed out of the booster 44, a boosting pressure sensor SW5 attached to the surge tank disposed downstream of the intercooler 46 and configured to detect pressure of the gas at a position downstream of the booster 44, a fourth intake air temperature sensor SW51 attached to the surge tank disposed downstream of the intercooler 46 and configured to detect a temperature of the gas, the pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the upstream catalytic converter and configured to detect an oxygen concentration within the exhaust gas, a lambda $O_2$ sensor SW9 disposed in the upstream catalytic converter downstream of the three-way catalyst 511 and configured to detect an oxygen concentration within the exhaust gas after passed through the three-way catalyst 511, a first water temperature sensor SW10 (see the upper right part of FIG. 1) attached to the cylinder head 13 and configured to detect a temperature of cooling water, a second water temperature sensor SW101 attached near a discharge port of the cylinder head 13 leading toward a main radiator, and configured to detect a temperature of the cooling water, a third water temperature sensor SW102 attached near a discharge port leading toward a water pump W/P of the main radiator, and configured to detect a temperature of cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, a fuel pressure sensor SW16 attached to the common rail 64 of the fuel supply system 61 and configured to detect pressure of the fuel to be supplied to the injector 6, a fuel temperature sensor SW161 attached to the common rail 64 of the fuel supply system 61 and configured to detect a temperature of the fuel to be supplied to the injector 6, and a throttle opening sensor SW17 attached a drive motor of the throttle valve 43 and configured to detect an opening of the throttle valve 43.

Additionally, the sensors include the low-pressure fuel pressure sensor SW20 attached to the fuel supply path 62 between the high-pressure fuel pump 641 and the fuel pump 65, the fuel temperature sensor SW21 attached to the high-pressure fuel pump 641, a GPF pressure sensor SW22 attached to the GPF 512, a hydraulic pressure sensor SW23 attached to the cylinder block 12, and an oil level sensor SW24 attached to the bottom of the oil pan.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56. For example, the ECU 10 adjusts the boosting pressure by controlling an opening of the air bypass valve 48 based on a pressure difference between the upstream side and the downstream side of the booster 44, which is obtained from the detection signals of the intake air pressure sensor SW3 and the boosting pressure sensor SW5. Moreover, the ECU 10 adjusts an external EGR gas amount introduced into the combustion chamber 17 by controlling the opening of the EGR valve 54 based on a pressure difference between the upstream side and downstream side of the EGR valve 54 obtained from the detection signal of the EGR pressure difference sensor SW15. Details of the control of the engine 1 by the ECU 10 is described later.

(Operating Range of Engine)

Figure 5:
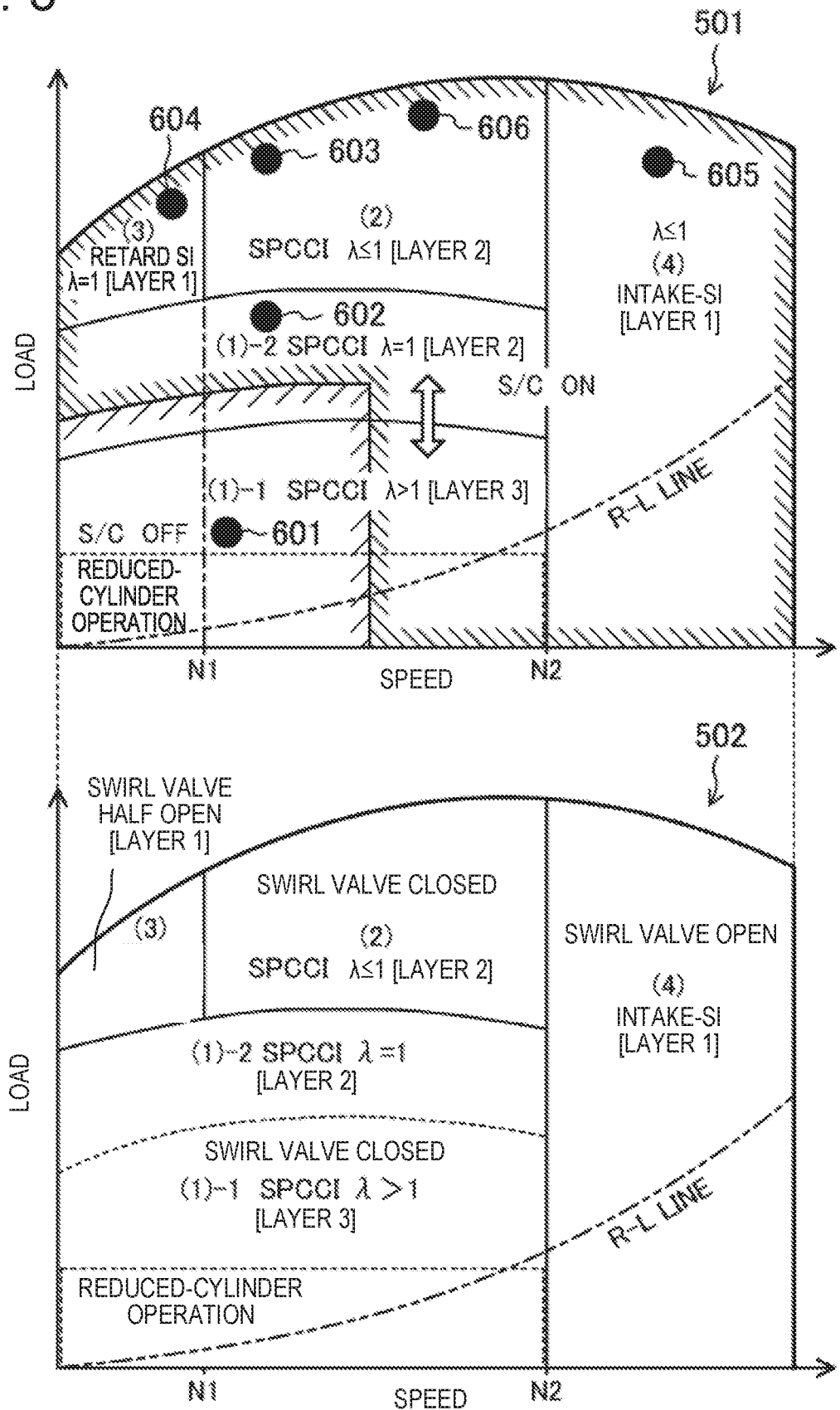
FIG. 5 shows a chart (upper chart) illustrating operating ranges of the engine and an excess air ratio in each operating range and a chart (lower chart) illustrating the operating ranges of the engine and a swirl valve opening in each operating range according to the embodiment of the present disclosure.

FIG. 5 illustrates operating range maps 501 and 502 of the engine 1. The operating range maps 501 and 502 of the engine 1 are divided into five ranges in terms of the engine load and the engine speed. For example, the five ranges include: a low load range (1)-1 including an idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in a high load range including a full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3). Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 5, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm. The high-load medium-speed range (2) may be a range where combustion pressure exceeds 900 kPa. In FIG. 5, the operating range maps 501 and 502 of the engine 1 are separately illustrated for the sake of easier understanding. The map 501 illustrates a state of the mixture gas and a combustion mode within each range, and a driving range and a non-driving range of the booster 44. The map 502 illustrates the opening of the SCV 56 within each range. Note that the two-dotted chain line in FIG. 5 indicates the road-load line of the engine 1.

Mainly for improving fuel efficiency and exhaust gas performance, the engine 1 performs combustion by compression self-ignition (i.e., SPCCI combustion) within the low load range (1)-1, the medium load range (1)-2, and the high-load medium-speed range (2).

In the SPCCI combustion, the spark plug 25 forcibly ignites the mixture gas inside the combustion chamber 17 so that it is subjected to the SI combustion through flame propagation, and the heat generated by this combustion raises the temperature inside the combustion chamber 17 and the pressure inside the combustion chamber 17 rises by flame propagation, which leads to the CI combustion of unburned mixture gas by self-ignition.

It is possible to reduce the variation of the temperature inside the combustion chamber 17 before the compression starts by adjusting the heat generation amount in the SI combustion. Therefore, even when the temperature inside the combustion chamber 17 varies before the compression starts, for example, by controlling the ignition timing to adjust the start timing of the SI combustion, the mixture gas self-ignites at a target timing.

In the SPCCI combustion, the heat generation in the SI combustion is slower than the heat generation in the CI combustion. A waveform of a heat generation rate in the SPCCI combustion has a relatively gentle slope as indicated by the reference characters 6014, 6024, 6034, and 6063 of FIG. 6. Moreover, a pressure variation (dp/dθ) in the combustion chamber 17 is gentler in the SI combustion than in the CI combustion. In other words, the heat generation rate waveform of the SPCCI combustion is formed to have a first heat generation rate portion formed by the SI combustion and having a relatively gentle rising slope, a second heat generation rate portion formed by the CI combustion and having a relatively sharp rising slope, which are next to each other in this order.

When the temperature and pressure inside the combustion chamber 17 rise due to the SI combustion, the unburned mixture gas self-ignites. In the example of the waveforms 6014, 6024, 6034 and 6063 of the heat generation rate illustrated in FIG. 6, the slope of the waveform changes from gentle to sharp depending on the timing of self-ignition. That is, the waveform of the heat generation rate has a flexion point at a timing when the CI combustion starts.

After the CI combustion starts, the SI combustion and the CI combustion are performed in parallel. In the CI combustion, since the heat generation is greater than in the SI combustion, the heat generation rate becomes relatively high. Note that since the CI combustion is performed after CTDC, the piston 3 descends by motoring. Therefore, the slopes of the waveforms 6014, 6024, 6034, and 6063 of the heat generation rate by the CI combustion are avoided from becoming excessively sharp. The dp/dθ in the CI combustion also becomes relatively gentle.

The dp/dθ is usable as an index expressing the combustion noise. Since the SPCCI combustion is able to lower the dp/dθ as described above, it becomes possible to avoid the combustion noise from becoming excessively loud. Thus, combustion noise is suppressed below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving fuel efficiency of the engine 1 compared to the SI combustion.

Further, in the SPCCI combustion, a combustion controller (EGR, VVT, intake air amount controller) is controlled to change the heat generation amount of the SI combustion (the first heat generation rate portion) according to the operating state of the engine, so that the start timing of the CI combustion (the second heat generation rate portion) reaches a target CI combustion start timing set according to the operating state of the engine.

Further, the engine 1 performs the SI combustion operation by spark-ignition within the other ranges, specifically, the high-load low-speed range (3) and the high speed range (4). Hereinafter, the operation of the engine 1 within each range is described in detail with reference to the fuel injection timing and the ignition timing illustrated in FIG. 6.

Figure 6:
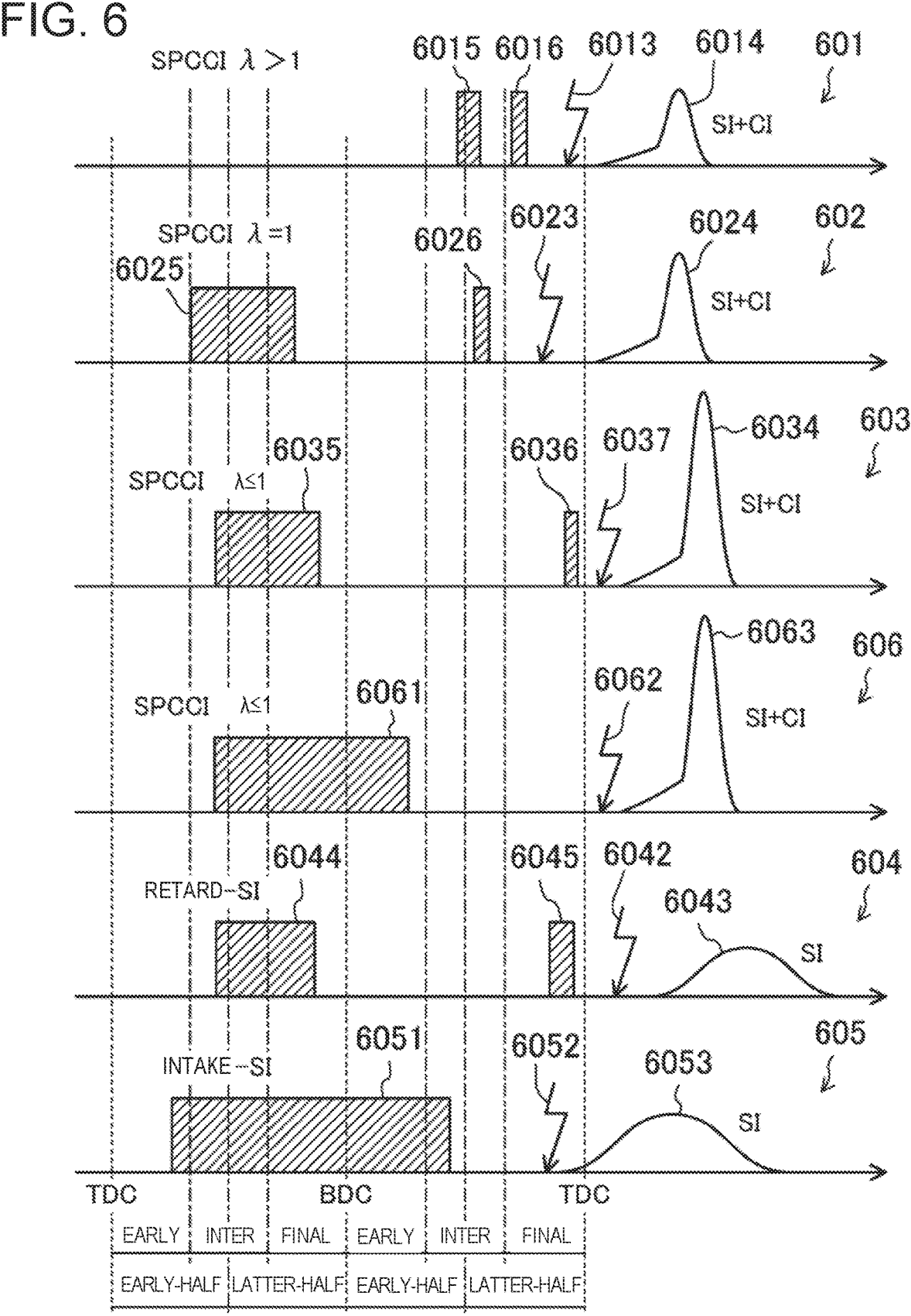
FIG. 6 shows timing charts illustrating a fuel injection timing, an ignition timing, and a combustion waveform in each operating range of the engine according to the embodiment of the present disclosure.

FIG. 6 shows a fuel injection timing and an ignition timing within each range of the operating range maps 501 and 502 of FIG. 5. Reference characters 601, 602, 603, 604, 605, and 606 of FIG. 6 correspond to operating states 601, 602, 602, 603, 604, 605, and 606 of FIG. 5, respectively. The operating state 606 corresponds to an operating state where an engine speed is high within the high-load medium-speed range (2).

(Low Load Range (1)-1)

When the engine 1 is operating within the low load range (1)-1, the engine 1 performs the CI combustion operation as described above. In the combustion caused by self-ignition, the timing of the self-ignition changes greatly if the temperature inside the combustion chamber varies before the compression starts. Therefore, within the low load range (1)-1, the engine 1 performs the SPCCI combustion operation in which the SI combustion and the CI combustion are combined.

When the engine 1 operates in the operating state 601 of the low load range (1)-1, the injector 6 injects the fuel into the combustion chamber 17 by splitting it into in a plurality of injections on the compression stroke (see the reference characters 6015 and 6016). The mixture gas is stratified in a center portion and an outer circumferential portion of the combustion chamber 17 by the split injections of the fuel and a strong swirl flow in the combustion chamber 17.

After the fuel injection is ended, the spark plug 25 ignites the mixture gas in the center portion of the combustion chamber 17 at a given timing before CTDC (see the reference character 6013). Since the fuel concentration of the mixture gas in the center portion is relatively high, ignitability improves and the SI combustion by the flame propagation stabilizes. By stabilizing the SI combustion, the CI combustion starts at the suitable timing (see the combustion waveform 6014). The controllability of the CI combustion improves in the SPCCI combustion. As a result, when the engine 1 operates within the low load range (1)-1, both the reduction of the generation of combustion noise and the improvement of the fuel efficiency by the shortening of the combustion period are achieved.

Since the engine 1 performs the SPCCI combustion while the mixture gas is lean within the low load range (1)-1, the low load range (1)-1 may be referred to as "SPCCI $\lambda$>1 range," i.e., a second combustion mode.

(Medium Load Range (1)-2)

Also when the engine 1 is operating within the medium load range (1)-2, the engine 1 performs the SPCCI combustion operation similarly to the low load range (1)-1.

When the engine 1 operates in the operating state 602 within the medium load range (1)-2, the injector 6 performs the fuel injection on the intake stroke (see the reference character 6025) and the fuel injection on the compression stroke (see the reference character 6026). By performing a first injection 6025 on the intake stroke, the fuel is distributed substantially evenly into the combustion chamber 17. By performing a second injection 6026 on the compression stroke, at a high engine load within the medium load range (1)-2, the temperature inside the combustion chamber 17 is lowered by latent heat of vaporization of the fuel, and thus, abnormal combustion, such as knocking, is prevented. A ratio between the injection amount of the first injection 6025 and the injection amount of the second injection 6026 may be, for example, 95:5.

When the injector 6 performs the first injection 6025 on the intake stroke and the second injection 6026 on the compression stroke, the mixture gas with the excess air ratio $\lambda$ of 1.0±0.2 as a whole is formed in the combustion chamber 17. Since the fuel concentration of the mixture gas is substantially homogeneous, the improvement in the fuel efficiency by reducing the unburned fuel loss and the improvement in the exhaust gas performance by avoiding the smoke generation are achieved. The excess air ratio $\lambda$ is preferably 1.0 to 1.2.

By the spark plug 25 igniting the mixture gas at a given timing before CTDC (see the reference character 6023), the mixture gas combusts by flame propagation. After the combustion by flame propagation is started, the unburned mixture gas self-ignites at the target timing and causes the CI combustion (see the combustion waveform 6024).

Within the medium load range (1)-2, since the engine 1 performs the SPCCI combustion by setting the mixture gas to a stoichiometric air-fuel ratio, the medium load range (1)-2 may be referred to as "SPCCI $\lambda$=1 range," i.e., a first combustion mode.

Here, as illustrated in the map 501 of FIG. 5, the booster 44 is turned off (see "S/C OFF" in FIG. 5) within part of the low load range (1)-1 and part of the medium load range (1)-2. In detail, the booster 44 is turned off within a low speed segment of the low load range (1)-1. Within a high speed segment of the low load range (1)-1, the booster 44 is turned on to increase the boosting pressure in order to secure a required intake charge amount corresponding to the engine speed being high. Further, within a low-load low-speed segment of the medium load range (1)-2, the booster 44 is turned off. Within a high load segment of the medium load range (1)-2, the booster 44 is turned on in order to secure the required intake charge amount corresponding to the engine speed being high. Further within the high speed segment, the booster 44 is turned on in order to secure the required intake charge amount corresponding to the engine speed being high.

Note that within the high-load medium-speed range (2), the high-load low-speed range (3), and the high speed range (4), the booster 44 is turned on throughout the ranges.

(High-Load Medium-Speed Range (2))

Also when the engine 1 is operating within the high-load medium-speed range (2), the engine 1 performs the SPCCI combustion operation similarly to the low load range (1)-1 and the medium load range (1)-2.

When the engine 1 operates in the operating state 603 at a low speed segment of the high-load medium-speed range (2), the injector 6 injects the fuel on the intake stroke (see the reference character 6035) and injects the fuel at a final stage of the compression stroke (see the reference character 6036).

The first-stage injection 6035 starting on the intake stroke may start the fuel injection in an early half of the intake stroke. The early half of the intake stroke may be defined by evenly dividing the intake stroke into two parts of the early half and the latter half. For example, the first-stage injection may start the fuel injection at 280° C.A before TDC.

When the injection of the first-stage injection 6035 is started in the early half of the intake stroke, the fuel spray hits an opening edge of the cavity 31 so that a portion of the fuel enters a squish area 171 of the combustion chamber 17 and the rest of the fuel enters into the cavity 31. The swirl flow is strong in the outer circumferential portion of the combustion chamber 17 and weak in the center portion. Therefore, the portion of the fuel entered the squish area 171 joins the swirl flow, and the rest of the fuel entered into the cavity 31 joins the inner side of the swirl flow. The fuel that joined the swirl flow remains in the swirl flow during the intake stroke and the compression stroke and forms the mixture gas for the CI combustion in the outer circumference portion of the combustion chamber 17. The fuel that enters the inner side of the swirl flow also remains at the inner side of the swirl flow during the intake stroke and the compression stroke and forms the mixture gas for the SI combustion in the center portion of the combustion chamber 17.

The excess air ratio λ of the mixture gas in the center portion, where the spark plug 25 is disposed, preferably is 1 or less, and the excess air ratio λ of the mixture gas in the outer circumferential portion is 1 or less, preferably below 1. The air-fuel ratio (A/F) of the mixture gas in the center portion may be, for example, between 13 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. The air-fuel ratio of the mixture gas in the entire combustion chamber 17 may be between 12.5:1 and the stoichiometric air-fuel ratio, preferably between 12.5:1 and 13:1.

The second-stage injection 6036 performed in the final stage of the compression stroke may start the fuel injection at 10° C.A before TDC. By performing the second-stage injection immediately before TDC, the temperature in the combustion chamber 17 is lowered by the latent heat of vaporization of the fuel. A low-temperature oxidation reaction of the fuel injected by the first-stage injection 6035 progresses on the compression stroke and transitions to a high-temperature oxidation reaction before TDC. Here, by performing the second-stage injection 6036 immediately before TDC so as to lower the temperature inside the combustion chamber, the transition from the low-temperature oxidation reaction to the high-temperature oxidation reaction is avoided and the pre-ignition is prevented. Note that the ratio between the injection amount of the first-stage injection 6035 and the injection amount of the second-stage injection 6036 may be, for example, 95:5.

The spark plug 25 ignites the mixture gas in the center portion of the combustion chamber 17 near CTDC (see the reference character 6037). The spark plug 25 ignites, for example, after CTDC. Since the spark plug 25 is disposed in the center portion of the combustion chamber 17, the ignition of the spark plug 25 causes the mixture gas in the center portion to start the SI combustion by flame propagation. The flame of the SI combustion propagates in the circumferential direction on a strong swirl flow inside the combustion chamber 17. At a given position of the outer circumferential portion of the combustion chamber 17 in the circumferential direction, the unburned mixture gas is compressed and ignited and the CI combustion starts (see the combustion waveform 6034).

In this regard, when the engine 1 operates in the operating state 606 at the high speed side of the high-load medium-speed range (2), the injector 6 starts the fuel injection on the intake stroke (see the reference character 6061).

The first-stage injection 6061 starting on the intake stroke may start the fuel injection in the early half of the intake stroke similarly to the first-stage injection 6035 in the operating state 603. For example, the first-stage injection 6061 may start the fuel injection at 280° C.A before TDC. The first-stage injection 6061 may last over the intake stroke and end on the compression stroke. By setting the start of injection of the first-stage injection 6061 in the early half of the intake stroke, the mixture gas for the CI combustion is formed in the outer circumferential portion of the combustion chamber 17 and the mixture gas for the SI combustion is formed in the center portion of the combustion chamber 17. Abnormal combustion does not easily occur due to the high engine speed, the second-stage injection may be omitted.

The spark plug 25 ignites the mixture gas in the center portion of the combustion chamber 17 near CTDC (see the reference character 6062). The spark plug 25 ignites, for example, after CTDC. Thus, the SPCCI combustion is performed (see the combustion waveform 6063).

Within the high-load medium-speed range (2), since the engine 1 performs the SPCCI combustion operation while the mixture gas is richer, the high-load medium-speed range (2) may be referred to as "SPCCI λ≤1 range."

(High-Load Low-Speed Range (3))

When the engine speed is low, the time length for the crank angle to change 1° becomes longer. Within the high-load low-speed range (3), if the fuel is injected into the combustion chamber 17 in the intake stroke and the early half of the compression stroke similarly to within the high-load medium-speed range (2), the reaction of the fuel excessively progresses and causes pre-ignition. When the engine 1 is operating within the high-load low-speed range (3), it becomes difficult to perform the SI combustion operation.

Therefore, when the engine 1 is operating within the high-load low-speed range (3), the engine 1 performs the SI combustion operation instead of the SPCCI combustion operation.

When the engine 1 operates in the operating state 604 within the high-load low-speed range (3), the injector 6 injects the fuel into the combustion chamber 17 at the timings of the intake stroke and in a retard period from the final stage of the compression stroke to the early stage of the expansion stroke (see the reference characters 6044 and 6045). By injecting the fuel in two injections as described above, the amount of fuel injected in the retard period is reduced. By injecting the fuel on the intake stroke (see the reference character 6044), the formation period of time of the mixture gas is sufficiently secured. Additionally, by injecting the fuel in the retard period (see the reference character 6045), the flow in the combustion chamber 17 immediately before the ignition is strengthened, which is advantageous in stabilizing the SI combustion. This fuel injection mode is particularly effective when the geometric compression ratio of the engine 1 is small.

After the fuel is injected, the spark plug 25 ignites the mixture gas at a timing near CTDC (see the reference character 6042). The spark plug 25 ignites, for example, after CTDC. The mixture gas causes the SI combustion on the expansion stroke. Since the SI combustion starts on the expansion stroke, the CI combustion does not start (see the combustion waveform 6043).

Within the high-load low-speed range (3), since the engine 1 performs the SI combustion operation by injecting the fuel in the retard period from the final stage of the compression stroke to the early stage of the expansion stroke, the high-load low-speed range (3) may be referred to as "retarded SI range."

(High Speed Range (4))

When the engine speed is high, the time length for the crank angle to change 1° becomes shorter. Therefore, for example, within a high speed segment of the high load range, it is difficult to stratify the mixture gas in the combustion chamber 17 by performing the split injections during the compression stroke. That is, when the engine speed increases, it becomes difficult to perform the SPCCI combustion operation described above. Therefore, when the engine 1 is operating within the high speed range (4), the engine 1 performs the SI combustion operation instead of the SPCCI combustion operation. Note that the high speed range (4) extends over the entire load direction from low load to high loads.

The reference character 605 in FIG. 6 indicates one example of the fuel injection timing (see the reference characters 6051) and the ignition timing (see the reference character 6052), and a combustion waveform (see the reference character 6053) when the engine 1 is operating in a high load segment of the high speed range (4).

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating in the high speed range (4), the engine 1 fully opens the SCV 56. No swirl flow is generated in the combustion chamber 17, and only the tumble flow is generated. By fully opening the SCV 56, the charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F≈44.7:1) in the entire combustion chamber 17. That is, the excess air ratio λ of the mixture gas may be 1.0±0.2. Note that within a high load segment of the high speed range (4) including the full load, the excess air ratio λ of the mixture gas may be less than 1.

When the engine 1 operates within the high speed range (4), the injector 6 starts the fuel injection on the intake stroke. The injector 6 injects all the fuel for one combustion cycle in a lump. Note that the reference character 6051 of FIG. 6 indicates a fuel injection state where the engine load is high and the fuel injection amount is large, and the fuel injection period changes according to the fuel injection amount. By starting the fuel injection on the intake stroke, a homogeneous or substantially homogeneous mixture gas is formed in the combustion chamber 17. Further, when the engine speed is high, since the vaporization time of the fuel is secured as long as possible, the unburned fuel loss and generation of soot are reduced.

After the fuel injection is ended, the spark plug 25 ignites the mixture gas at a suitable timing before CTDC (see the reference character 6052).

Within the high speed range (4), since the engine 1 starts the fuel injection on the intake stroke and performs the SI combustion, the high speed range (4) may be referred to as "intake SI range."

("Reduced-Cylinder Operation" in Low Load Range (1)-1)

In this embodiment, as illustrated in FIG. 5, the reduced-cylinder operation is performed within a lowest load segment of the low load range (1)-1 (here, for the sake of convenience, referred to as "layer 3"). The lowest load segment of the layer 3 may be, for example, a range of 200 kPa and below in terms of a Brake Mean Effective Pressure (BMEP). Note that the BMEP does not indicate the engine load itself, but a value obtained by multiplying the BMEP by an exhaust gas amount is in proportion to an axial torque.

Within such an operating range where the BMEP is 200 kPa or below, since a throttle loss (pumping loss) when the engine 1 combusts increases, the reduced-cylinder operation (cylinder-deactivation operation) in which operation of some of the plurality of cylinders (e.g., two of four cylinders) is suspended is performed. Here, the throttle valve 43 is also opened for the suspended cylinders. For the cylinder in operation, as described above, the compression ratio (geometric compression ratio) of the mixture gas may be set comparatively large as 13.0:1 or above.

Since such a reduced-cylinder operation increases the load of the two suspended cylinders during operation, the throttle loss is reduced.

Note that the intake and exhaust valves of the suspended cylinders may be in the operating state. With this configuration, since a valve stop mechanism is not required, a manufacturing cost of the engine which is performable of the reduced-cylinder operation is reduced.

During the reduced-cylinder operation, although the booster 44 does not perform the boost, the electromagnetic clutch 45 of the booster 44 may remain connected regardless of the engine speed so that a mechanical load due to connecting/disconnecting the electromagnetic clutch 45 decreases.

Further, as illustrated in the map 502 of FIG. 5, during the reduced-cylinder operation, the swirl flow may be generated in the cylinders in operation. In this case, the swirl ratio of the swirl flow may be set to 4 or above. Thus, the SI combustion at the excess air ratio λ>1, i.e., lean A/F, is stably performed, and the swirl flow within the combustion chamber is enhanced, which further stabilizes the SI combustion.

When the temperature of the intake air into the combustion chamber is below a given value, the all-cylinder operation may be performed instead of the reduced-cylinder operation. Thus, the instability of the SI combustion at a low intake air temperature is eliminated, therefore, the combustion timing in the subsequent CI combustion is prevented from delaying.

Moreover, when the cooling water temperature of the engine 1 is below a given value, the all-cylinder operation may be performed instead of the reduced-cylinder operation. Thus, in the all-cylinder operation, compared to the reduced-cylinder operation, cooling of the end gas (unburned mixture gas) near the wall surface of the combustion chamber or in vicinity thereof is promptly canceled, which prevents the delay of the combustion start timing of the CI combustion.

Moreover, as illustrated in FIG. 5, within the medium load range (1)-2 (here, for the sake of convenience, referred to as "layer 2"), the SI combustion and the CI combustion are performed in this order at the air-fuel ratio equivalent to the stoichiometric air-fuel ratio (i.e., λ=1).

Here, the reduced-cylinder operation may not be performed also in a case where the current operating state shifts from the layer 2 where the operation is performed at the air-fuel ratio equivalent to the excess air ratio λ=1 to the layer 3 according to the operating state of the engine 1. That is, even if the operating state shifts to the layer 3 while the engine 1 is operating in the layer 2 equivalent to λ=1, the all-cylinder operation is continued without shifting to the reduced-cylinder operation. Thus, generation of $NO_x$ when shifting the control to the reduced-cylinder operation is prevented.

Next, relationships between the engine load and the fuel amount in the layer 2 and the layer 3 are described with reference to the drawings.

Figure 7:
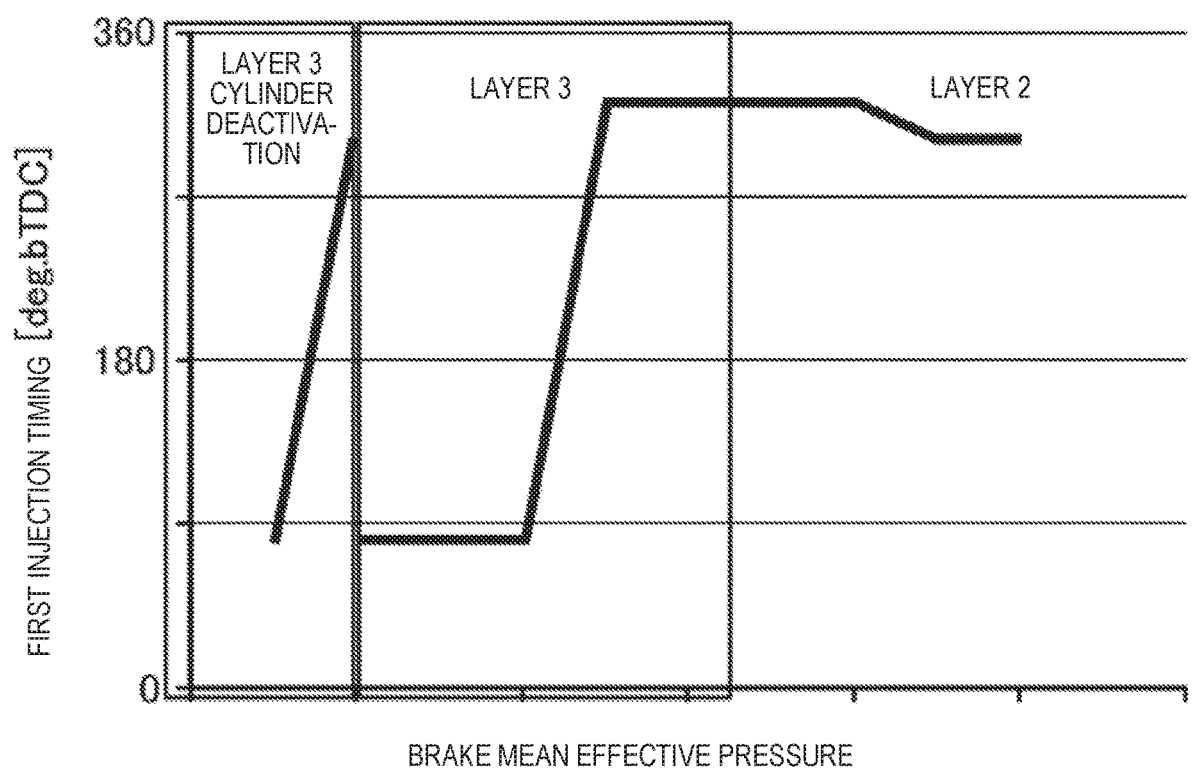
FIG. 7 is a chart illustrating a relationship between a first injection timing and a load (brake mean effective pressure) in a layer 2 of the operating range of the engine (operating range (1)-2) and a layer 3 including a reduced-cylinder operation (operating range (1)-1) according to the embodiment of the present disclosure.
Figure 8:
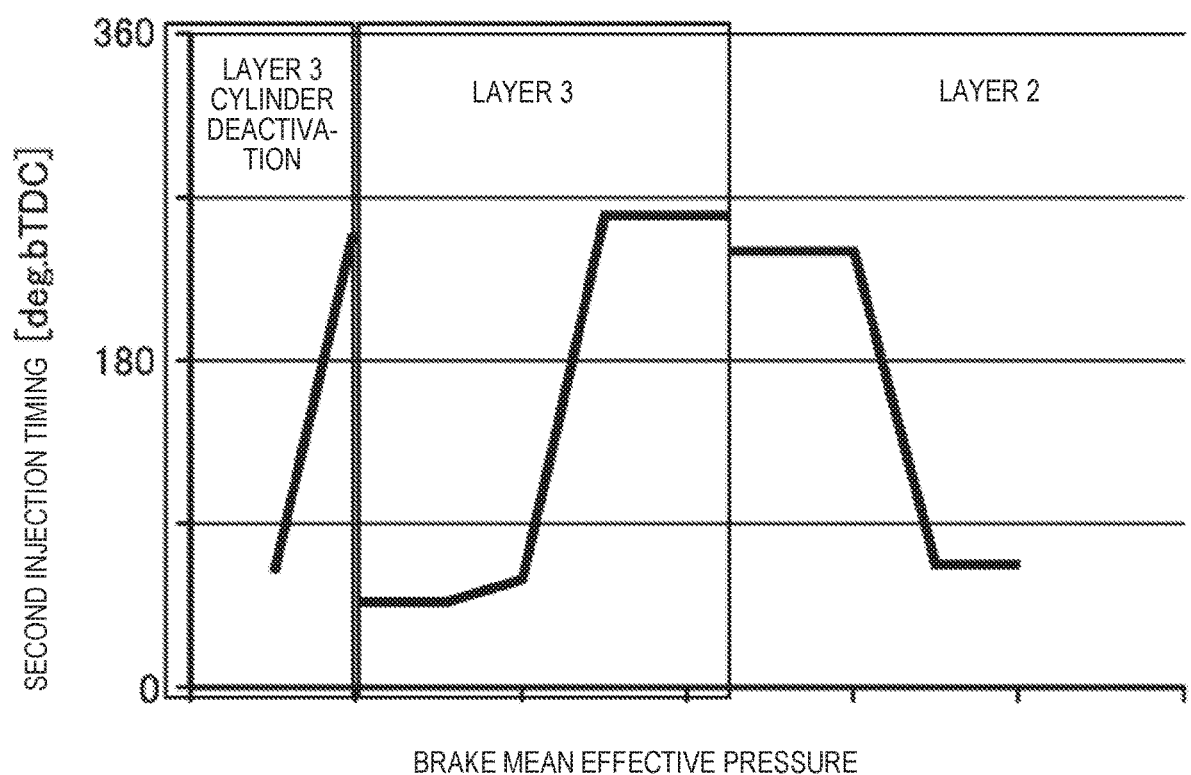
FIG. 8 is a chart illustrating a relationship between a second injection timing and the load in the layer 2 of the operating range of the engine and the layer 3 including the reduced-cylinder operation according to the embodiment of the present disclosure.
Figure 9:
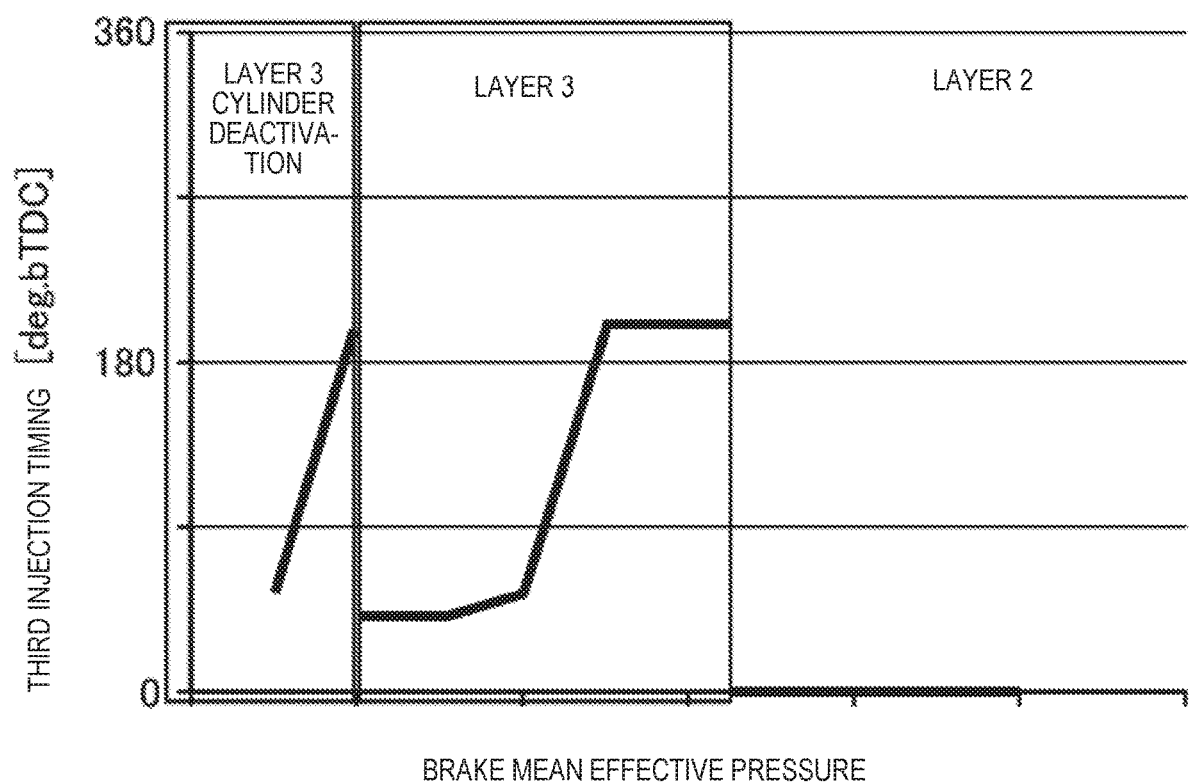
FIG. 9 is a chart illustrating a relationship between a third injection timing and the load in the layer 2 of the operating range of the engine and the layer 3 including the reduced-cylinder operation according to the embodiment of the present disclosure.
Figure 10:
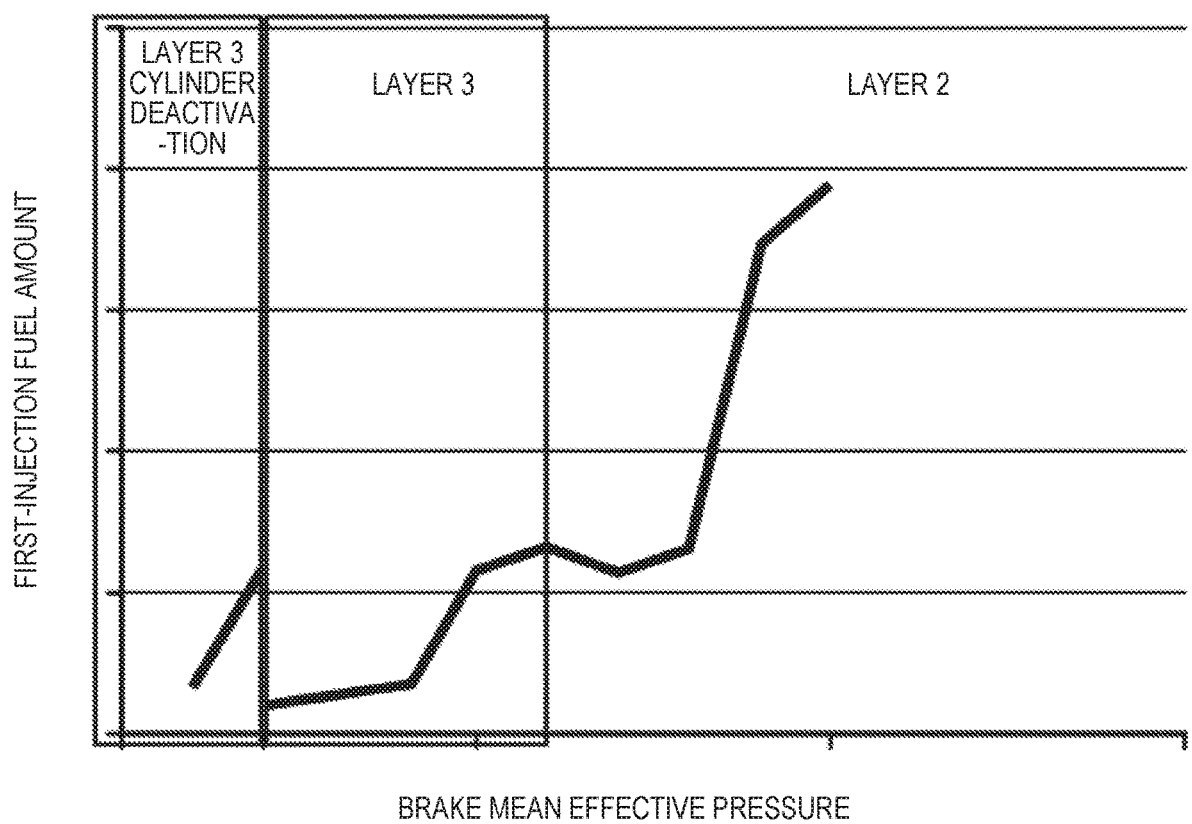
FIG. 10 is a chart illustrating a relationship between a first-injection fuel amount per one combustion cycle and the load in the layer 2 of the operating range of the engine and the layer 3 including the reduced-cylinder operation according to the embodiment of the present disclosure.
Figure 11:
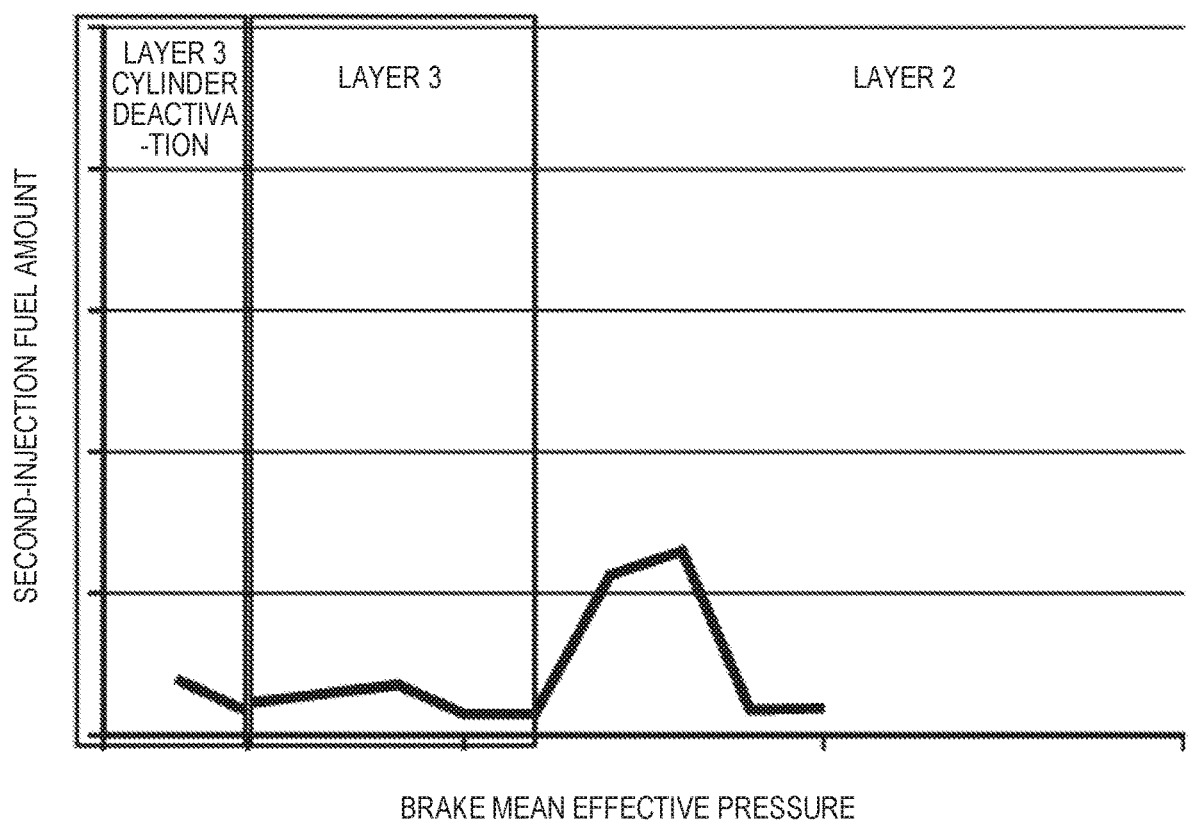
FIG. 11 is a chart illustrating a relationship between a second-injection fuel amount per one combustion cycle and the load in the layer 2 of the operating range of the engine and the layer 3 including the reduced-cylinder operation according to the embodiment of the present disclosure.
Figure 12:
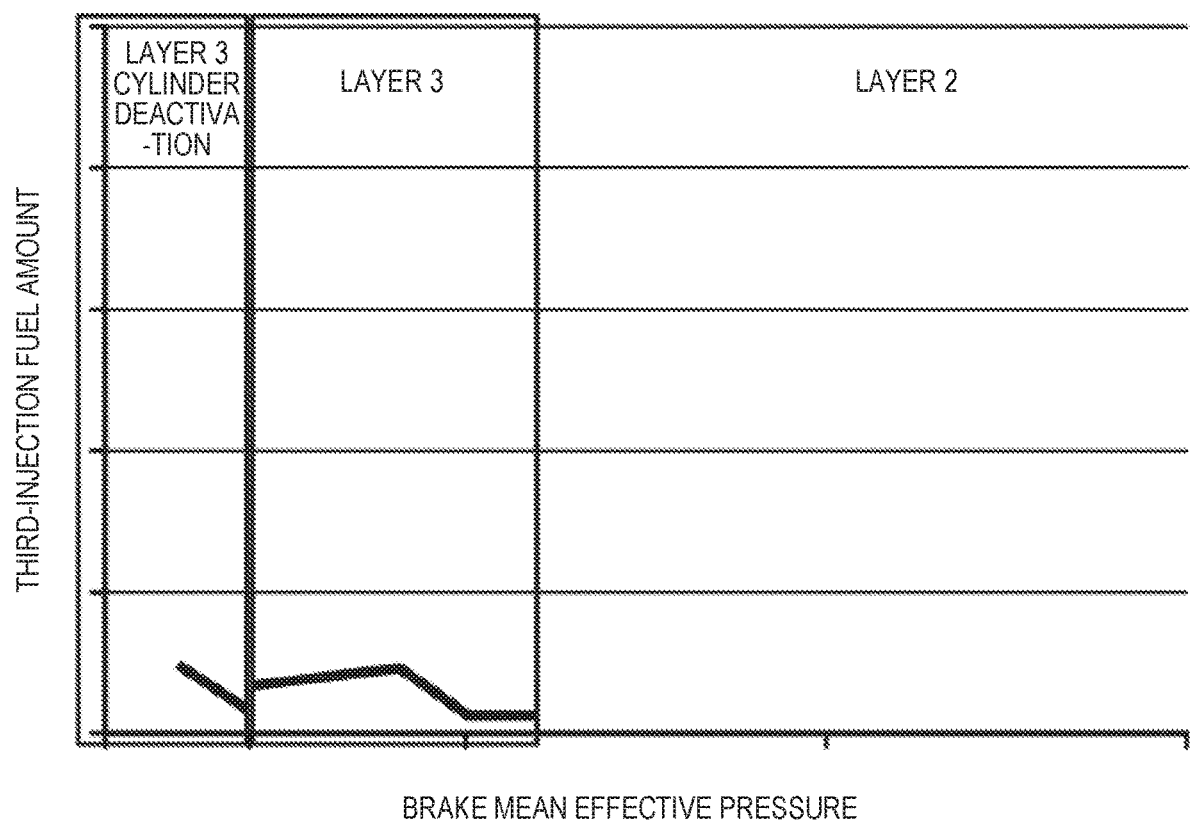
FIG. 12 is a chart illustrating a relationship between a third-injection fuel amount per one combustion cycle and the load in the layer 2 of the operating range of the engine and the layer 3 including the reduced-cylinder operation according to the embodiment of the present disclosure.

FIGS. 7 to 9 illustrate one example of a relationship of first to third injection timings with each load in the layer 3 including the reduced-cylinder operation (cylinder deactivation) and the layer 2. Further FIGS. 10 to 12 illustrate one example of a relationship of the fuel amount per one combustion cycle with the load per every plurality of fuel injection timings. The engine speed in each chart of FIGS. 7 to 12 is, for example, about 3,500 rpm. This is similar for FIGS. 13 to 16 described later.

For example, as illustrated in FIG. 7, the first injection timing of the three injection timings may be approximately 88° C.A before CTDC (bTDC). At a further lower engine load at which the operating state shifts to the layer 3 where the cylinder deactivation is performed, the first injection timing may be approximately 320° C.A before CTDC, and advanced to an early stage of the intake stroke. The first injection timing may be retarded to 90° C.A before CTDC as the engine load decreases.

Meanwhile, as illustrated in FIG. 10, a first-injection fuel amount gradually decreases as the engine load decreases in the layer 3 where the all-cylinder operation is performed, and it is increased by approximately six times at an engine load at which the operating state shifts to the cylinder deactivation. The first-injection fuel amount is reduced as the engine load further decreases.

As illustrated in FIG. 8, the second injection timing of the three injection timings may be approximately 60 to 50° C.A before CTDC. At a further lower engine load at which the operating state shifts to the layer 3 where the cylinder deactivation is performed, the second injection timing may be approximately 250° C.A before CTDC. The second injection timing may be retarded to 60° C.A before CTDC as the engine load decreases.

Meanwhile, as illustrated in FIG. 11, a second-injection fuel amount gradually decreases within the low load segment of the layer 3 where the all-cylinder operation is performed, and it is further reduced at the engine load at which the operating state shifts to the cylinder deactivation. The second-injection fuel amount is increased as the engine load further decreases.

As illustrated in FIG. 9, the third injection timing of the three injection timings may be approximately 45° C.A before CTDC within the low load segment of the layer 3 where the all-cylinder operation is performed. At the further lower engine load at which the operating state shifts to the layer 3 where the cylinder deactivation is performed, the third injection timing may be approximately 200° C.A before CTDC. The third injection timing may be retarded to 55° C.A before CTDC as the engine load decreases.

Meanwhile, as illustrated in FIG. 12, a third-injection fuel amount gradually decreases within the low load segment of the layer 3 where the all-cylinder operation is performed, and it is further reduced at the engine load at which the operating state shifts to the cylinder deactivation. The third-injection fuel amount is increased as the engine load further decreases.

Figure 13:
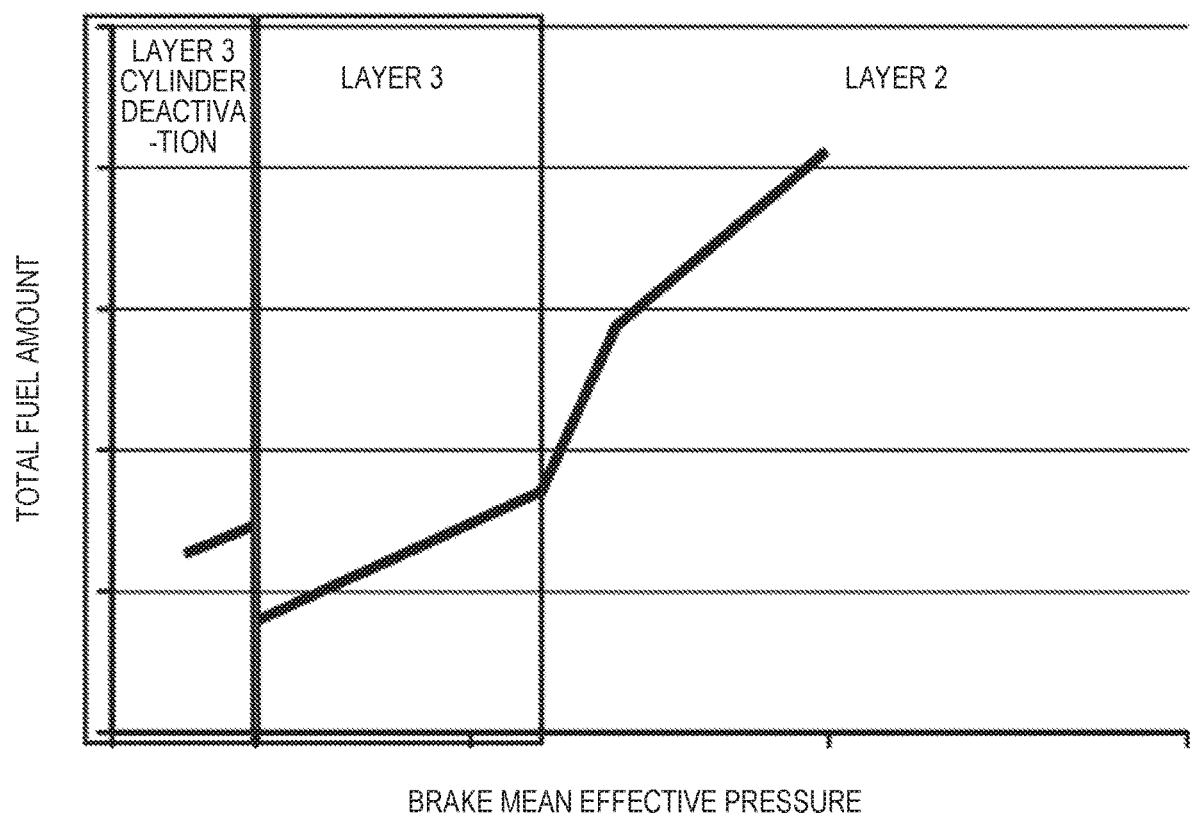
FIG. 13 is a chart illustrating a relationship between a total fuel amount per one combustion cycle and the load in the layer 2 of the operating range of the engine and the layer 3 including the reduced-cylinder operation according to the embodiment of the present disclosure.

FIG. 13 illustrates a relationship between a total fuel amount of the first- to third-injection fuel amounts in one combustion cycle, and the engine load. As illustrated in FIG. 13, the total fuel amount is increased at the engine load at which the operating state shifts to the cylinder deactivation operation. Thus, the throttle loss in the reduced-cylinder operation, that is, the two-cylinder operation, is reduced and, also within the low load range where a negative effect applies to the SPCCI combustion, a stable SPCCI combustion is achieved while making the air-fuel ratio A/F leaner.

Figure 14:
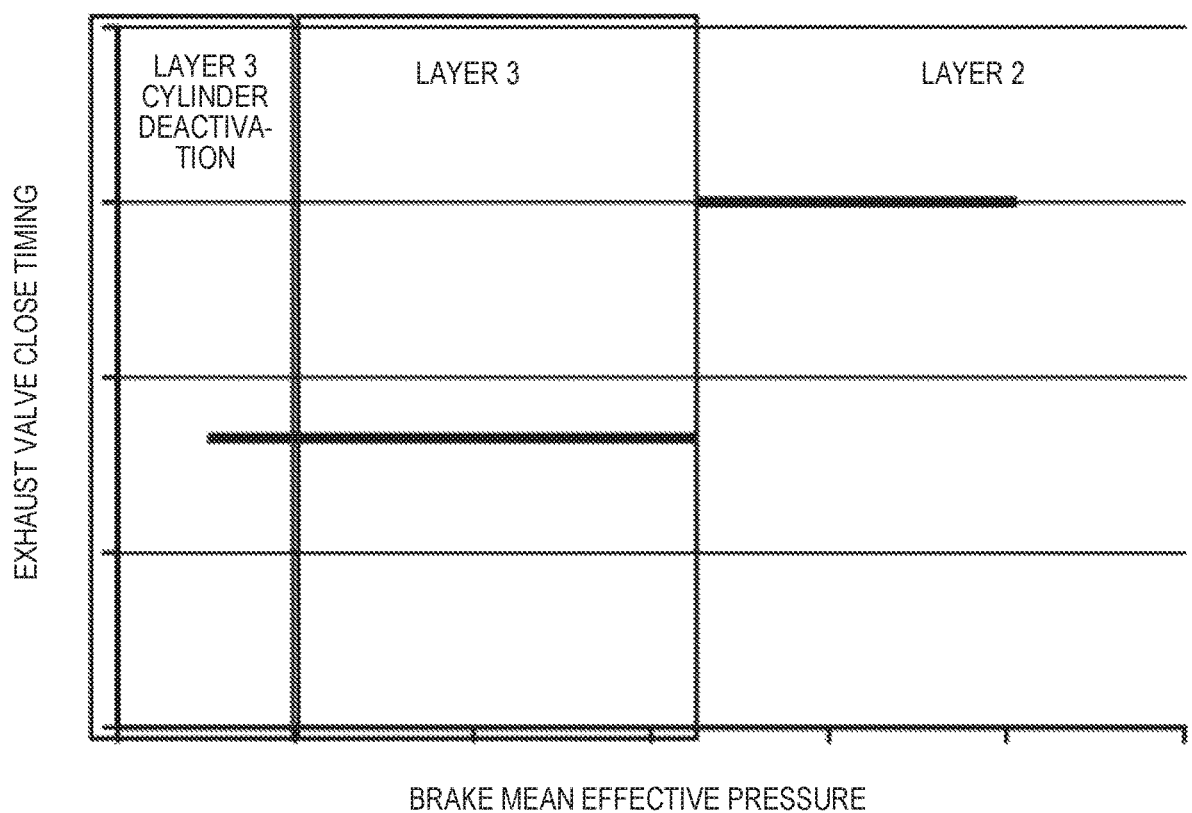
FIG. 14 is a chart illustrating a relationship between an exhaust valve close timing and the load in the layer 2 of the operating range of the engine and the layer 3 including the reduced-cylinder operation according to the embodiment of the present disclosure.
Figure 15:
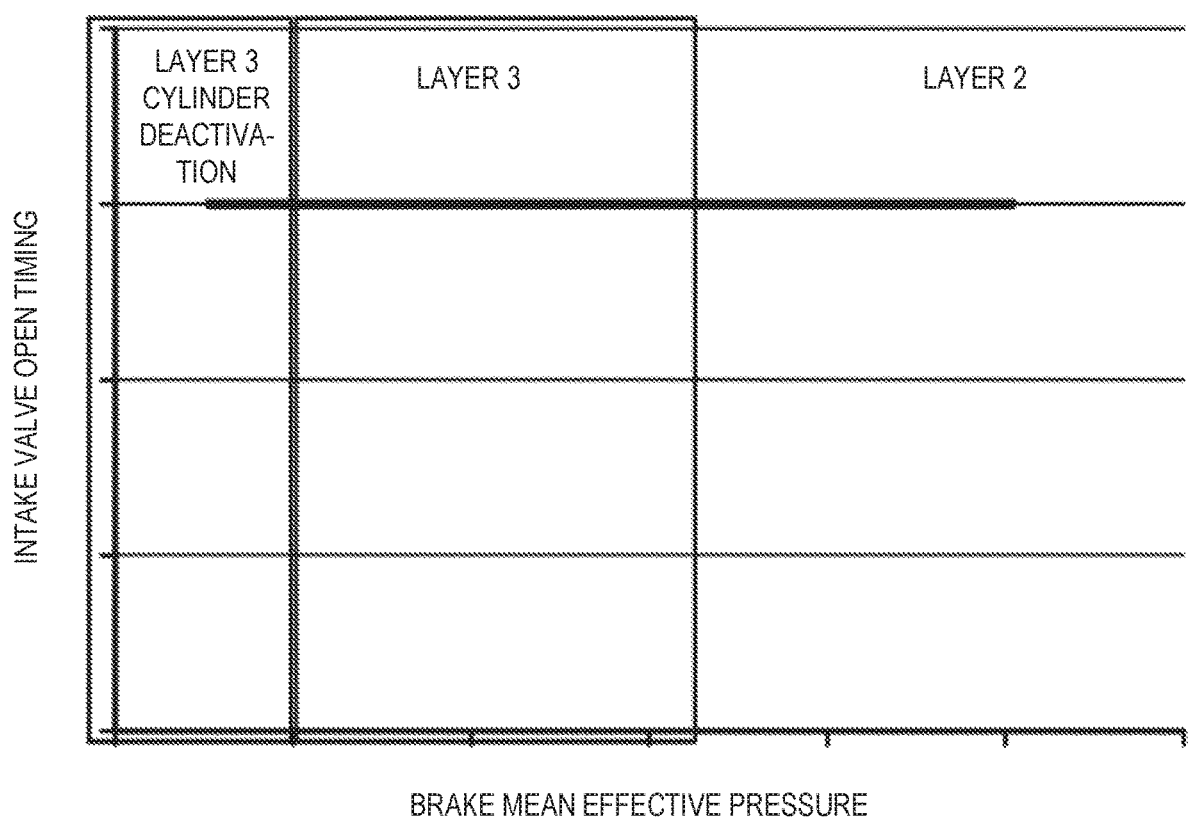
FIG. 15 is a chart illustrating a relationship between an intake valve open timing and the load in the layer 2 of the operating range of the engine and the layer 3 including the reduced-cylinder operation according to the embodiment of the present disclosure.
Figure 16:
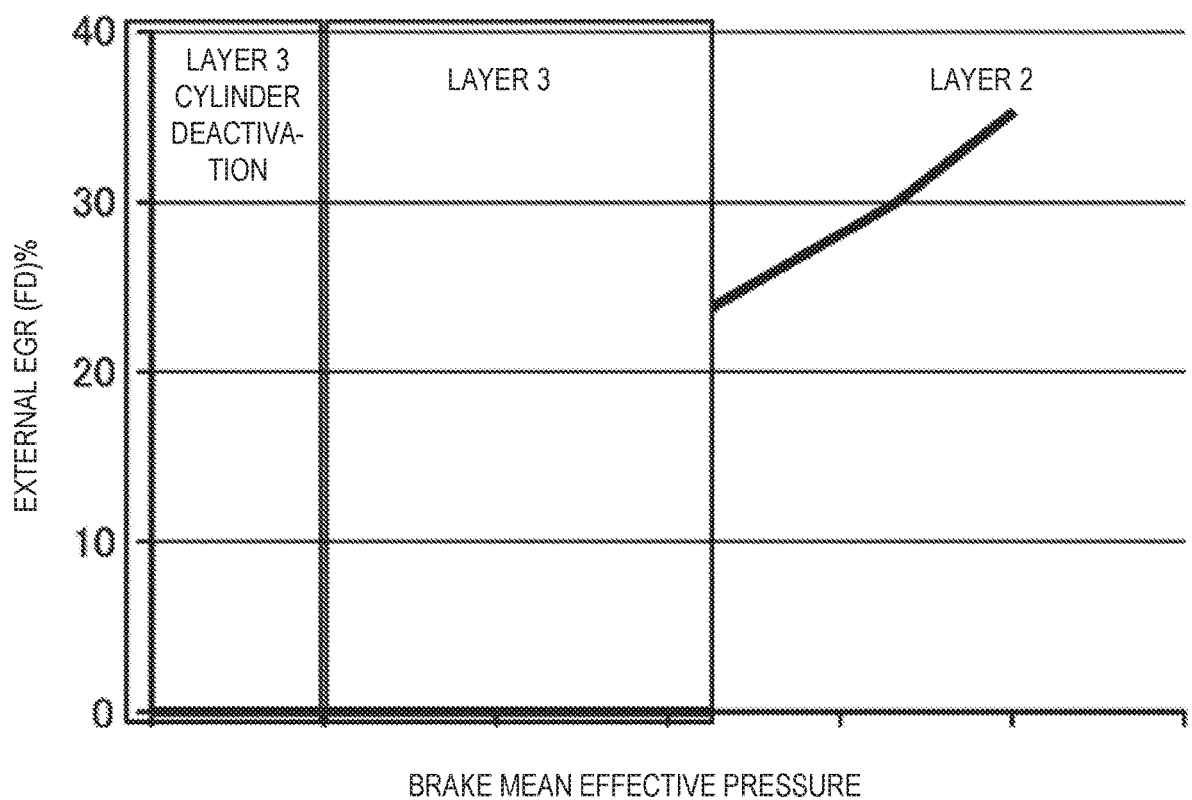
FIG. 16 is a chart illustrating a relationship between an adding amount of external EGR and the load in the layer 2 of the operating range of the engine and the layer 3 including the reduced-cylinder operation according to the embodiment of the present disclosure.

FIG. 14 illustrates one example of a relationship between the BMEP (corresponding to the engine load) and an exhaust valve close timing (EVC) in the layers 2 and 3. FIG. 15 illustrates one example of a relationship between the BMEP (corresponding to the engine load) and an intake valve open timing (IVO) in the layers 2 and 3. FIG. 16 illustrates one example of a relationship between the BMEP (corresponding to the engine load) and an addition rate of external EGR in the layers 2 and 3.

As illustrated in FIG. 14, the EVC after TDC in the layer 3 is earlier by about half the timing thereof in the layer 2.

On the other hand, as illustrated in FIG. 15, the IVO is the same in the layer 2 and the layer 3 including the reduced-cylinder operation.

Moreover, as illustrated in FIG. 16, in the layer 2, the addition rate of the external EGR gradually decreases to a boundary area with the layer 3. On the other hand, the addition rate is 0% over the entire layer 3, in other words, the external EGR is not added.

(Control Process of Cylinder Deactivation Operation of Engine)

Figure 17:
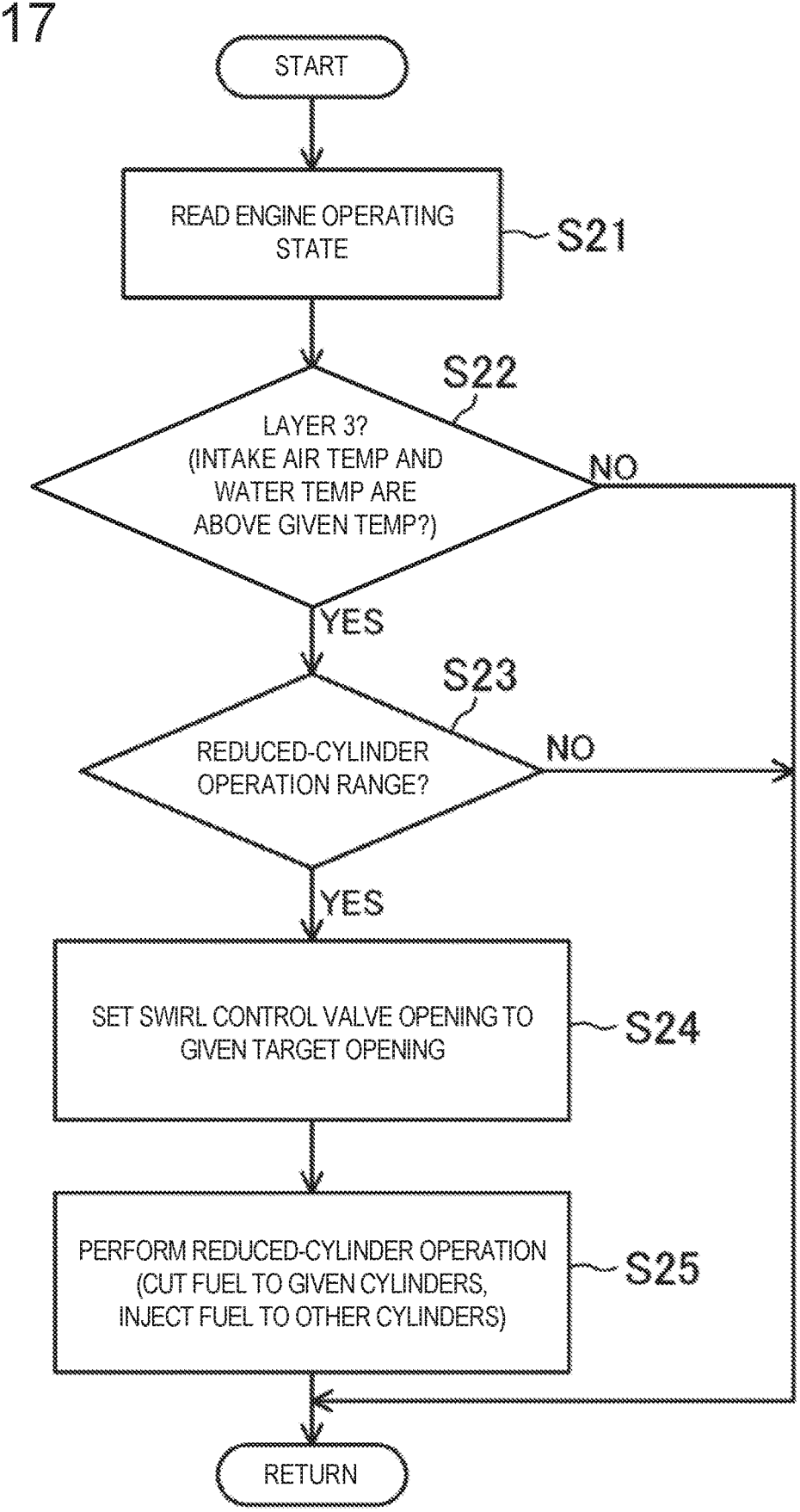
FIG. 17 is a flowchart illustrating a control process of a cylinder deactivation operation of the engine according to the embodiment of the present disclosure.

Next, an operation control of the engine 1 executed by the ECU 10 will be described with reference to the flowchart of FIG. 17. First, at S21 after the start, the ECU 10 illustrated in FIG. 4 reads the signals of the sensors SW1 to SW17, SW20 to SW24, SW31, SW51, SW101, SW102 and SW161. Next at S22, the ECU 10 determines the operating range of the engine 1. Here, whether the operating range is in the layer 3 illustrated in FIG. 5, specifically the low load range (1)-1 (SPCCI $\lambda$>1 range) is determined, and if it is in the layer 3, whether the temperature of the intake air and the temperature of the cooling water are both above a given temperature is determined. If not in the layer 3 or, even in the case of the layer 3, if one of the intake air temperature and the cooling water temperature is below the given temperature, the process returns to S21.

If the operating range is in the layer 3 and both of the intake air temperature and the cooling water temperature are above the given temperature, the process proceeds to S23.

At S23, whether the operating range is the reduced-cylinder operation (cylinder deactivation operation) range is determined. Whether being in the reduced-cylinder operation range is determined by determining whether BMEP is 200 kPa or below. For example, the accelerator opening sensor SW12 and/or the throttle opening sensor SW17, etc. may be used.

Here, if determined as being in the reduced-cylinder operation range, the process proceeds to S24. At S24, as described above, the ECU 10 outputs a control signal to the SCV 56 so that its opening ratio becomes 0 to 15%. Thus, the swirl ratio is between 4 and 6.

Next, the reduced-cylinder operation is performed at S25. That is, the ECU 10 outputs a control signal to the fuel supply system 61 so that the fuel supply for given two of the four cylinders is stopped. Further, the ECU 10 injects the fuel to the other two cylinders which continue to operate according to the total of three injection timings illustrated in FIGS. 7 to 9 and the corresponding fuel amounts illustrated in FIGS. 10 to 12. Then the process returns to S21.

(Other Embodiments)

Note that the art disclosed here is not limited to the application to the engine 1 having the above configuration. The configuration of the engine 1 may adopt various configurations.

Further, the engine 1 may include a turbocharger instead of the mechanical booster 44.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Control Unit)

11 Cylinder
17 Combustion Chamber
171 Squish Area
25 Spark Plug
3 Piston
31 Cavity
401 Primary Passage (First Intake Passage)
402 Secondary Passage (Second Intake Passage)
56 Swirl Control Valve (Swirl Generating Part)
6 Injector

What is claimed is:

1. A control system, comprising:
a compression-ignition engine having a plurality of cylinders, each cylinder formed with a combustion chamber;
a spark plug disposed in the combustion chamber;
a fuel injector disposed to be oriented into the combustion chamber; and
a control unit including a processor connected to the spark plug and the fuel injector, and configured to output a control signal to the spark plug and a control signal to the fuel injector, wherein
when the engine operates at a load above a first given load, the control unit causes the engine to perform an all-cylinder operation by supplying fuel to all the plurality of cylinders, and when the engine operates at a load below the first given load, the control unit causes the engine to perform a reduced-cylinder operation by supplying the fuel to one or some of the plurality of cylinders,
in the reduced-cylinder operation, the control unit controls the fuel injector to inject the fuel to the one or some of the plurality of cylinders to generate a mixture gas, controls the spark plug to ignite the mixture gas, and causes the engine to start, at an air-fuel ratio larger than a stoichiometric air-fuel ratio and a large compression ratio above a given value, SPCCI (SPark Controlled Compression Ignition) combustion in which spark ignition (SI) combustion in which the mixture gas is ignited by the spark plug to combust by flame propagation, and then perform compression ignition (CI) combustion in which unburned mixture gas ignites by self-ignition,
responsive to determining that a load on the engine has transitioned from above to below the first given load, the control unit switches an operating mode of the engine from a first combustion mode in which the SI combustion and the CI combustion are performed in this order at an air-fuel ratio equivalent to the stoichiometric air-fuel ratio, to a second combustion mode in which the SI combustion and the CI combustion are performed in this order at an air-fuel ratio larger than the stoichiometric air-fuel ratio,
when the engine operates in the first combustion mode, the reduced-cylinder operation is not performed, and
when the engine operates in the second combustion mode, the reduced-cylinder operation is performed.

2. The control system of claim 1, wherein, in the reduced-cylinder operation, the control unit operates an intake valve and an exhaust valve of each of the plurality of cylinders.

3. The control system of claim 1, wherein, when a temperature of intake air into the combustion chamber is below the given value, the control unit performs the all-cylinder operation instead of the reduced-cylinder operation.

4. The control system of claim 1, wherein, when a temperature of cooling water of the engine is below the given value, the control unit performs the all-cylinder operation instead of the reduced-cylinder operation.

5. The control system of claim 1, further comprising a swirl control valve configured to generate a swirl flow in the combustion chamber,
wherein the control unit controls the swirl control valve to generate the swirl flow in the combustion chamber in the reduced-cylinder operation.

6. The control system of claim 5, wherein a swirl ratio of the swirl flow is 2 to 6.

7. The control system of claim 1, wherein
responsive to determining that the engine is operating at a load above the first given load and above a second given load greater than the first given load, the control unit causes the engine to operate in the first combustion mode at the stoichiometric air-fuel ratio.

8. A control system, comprising:
a compression-ignition engine having a plurality of cylinders, each cylinder formed with a combustion chamber;
a spark plug disposed in the combustion chamber;
a fuel injection valve disposed to be oriented into the combustion chamber;
an air-fuel ratio control valve configured to control an air-fuel ratio of a mixture gas within the combustion chamber; and
a control unit connected to the spark plug, the fuel injection valve, and the air-fuel ratio control valve and configured to output a control signal to the spark plug, a control signal to the fuel injection valve, and a control signal to the air-fuel ratio control valve, wherein
the control unit includes a processor configured to execute:
an engine load determining module to determine whether an engine load is above a first given load;
an all-cylinder operation controlling module to, when the engine load is determined to be above the first given load, control the fuel injection valve to inject the fuel to all the plurality of cylinders; and
a reduced-cylinder operation controlling module to, when the engine load is determined to be below the first given load, control the fuel injection valve to stop the injection of the fuel to one or some of the plurality of cylinders,
wherein the reduced-cylinder operation controlling module has:
an air-fuel ratio controlling submodule configured to control the air-fuel ratio control valve to cause the air-fuel ratio to be larger than a stoichiometric air-fuel ratio; and
a spark plug controlling submodule configured to output the control signal to the spark plug to perform the ignition at a given ignition timing to perform SPCCI (SPark Controlled Compression Ignition) combustion so that the mixture gas starts combustion by flame propagation and then unburned mixture gas self-ignites, the given ignition timing being stored in memory,
responsive to determining that a load on the engine drops below the first given load, the control unit switches an operating mode of the engine from a first combustion mode in which a spark ignition (SI) combustion and a compression ignition (CI) combustion are performed in this order at an air-fuel ratio equivalent to the stoichiometric air-fuel ratio, to a second combustion mode in which the SI combustion and the CI combustion are performed in this order at an air-fuel ratio larger than the stoichiometric air-fuel ratio, when the engine operates in the first combustion mode, the reduced-cylinder operation is not performed, and when the engine operates in the second combustion mode, the reduced-cylinder operation is performed.

9. The control system of claim 8, wherein responsive to determining that the engine is operating at a load above the first given load and above a second given load greater than the first given load, the control unit causes the engine to operate in the first combustion mode at the stoichiometric air-fuel ratio.

\* \* \* \* \*